United States Patent
Pliner et al.

(10) Patent No.: US 11,769,097 B1
(45) Date of Patent: Sep. 26, 2023

(54) SYSTEMS AND METHODS FOR OBJECTIVE VALIDATION OF ENTERPRISE PROTOCOLS INVOLVING VARIABLE DATA SOURCES

(71) Applicant: Wells Fargo Bank, N.A., San Francisco, CA (US)

(72) Inventors: Jacob E. Pliner, Des Moines, IA (US); Stacy Renee Henryson, Clive, IA (US); Todd Kingma, San Francisco, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 146 days.

(21) Appl. No.: 16/993,863

(22) Filed: Aug. 14, 2020

(51) Int. Cl.
*G06Q 10/00* (2023.01)
*G06Q 10/0637* (2023.01)
*G06Q 10/0631* (2023.01)

(52) U.S. Cl.
CPC ... *G06Q 10/0637* (2013.01); *G06Q 10/06311* (2013.01)

(58) Field of Classification Search
CPC .............................. G06Q 10/00; G06Q 50/00
USPC ............................................... 705/7.11–7.42
See application file for complete search history.

(56) References Cited

U.S. PATENT DOCUMENTS

| | | | |
|---|---|---|---|
| 10,812,658 B1* | 10/2020 | Veloso | H04M 3/5232 |
| 11,070,671 B1* | 7/2021 | Gozzo | H04M 3/5141 |
| 2020/0007474 A1* | 1/2020 | Zhang | G09B 7/02 |
| 2020/0110823 A1* | 4/2020 | Steuer | G06F 16/252 |
| 2020/0151648 A1* | 5/2020 | Gorny | G06Q 10/063114 |
| 2021/0004305 A1* | 1/2021 | Hao | G06Q 10/20 |
| 2021/0158234 A1* | 5/2021 | Sivasubramanian | G10L 15/26 |
| 2021/0342554 A1* | 11/2021 | Martin | G06Q 10/0639 |

\* cited by examiner

*Primary Examiner* — Mustafa Iqbal
(74) *Attorney, Agent, or Firm* — Foley & Lardner LLP

(57) ABSTRACT

The present disclosure describes devices and methods of providing a technology environment for analyzing programs or initiatives of an enterprise. In particular, a computing device including a processor with computer readable instructions to access client resolution data that includes information regarding one or more resolutions. A resolution may be associated with a claim made by a client, and include multiple variables including correspondences between the client and the enterprise, an actual value corresponding to the claim, and an expected value corresponding to the claim. The computing system may generate a dataset of all of the resolutions, apply an outlier detection model, and provide an interactive summary of one or more outlier analysis tests via a graphical user interface.

20 Claims, 15 Drawing Sheets

US 11,769,097 B1

SYSTEMS AND METHODS FOR OBJECTIVE VALIDATION OF ENTERPRISE PROTOCOLS INVOLVING VARIABLE DATA SOURCES

TECHNICAL FIELD

The present disclosure relates generally to objective analysis and implementation of protocols involving varied data types from disparate data sources.

BACKGROUND

A large enterprise may have many unintegrated computing systems with incompatible or inadequately characterized data. When a new protocol is to be propagated, the protocols may be implemented inconsistently based on varied and subjective analyses and judgments of many different factors. The discretion that may be used at different points in the process may cause a large variance in how programs or initiatives are implemented. This issue may be compounded in large organizations that have separate teams with potentially different guidelines located in different regions or communities. Subjective interpretation and analysis of data tends to lead to great variations in how standards are applied. Consequently, clients may have expectations that are not met, different clients in similar situations may have significantly different experiences, or the organization may fall out of compliance with various standards. As a result, clients may lose faith in the organization, the organization may violate regulatory requirements, or the organization may have unexpected or undesired results from implementation of the new protocol. The data corresponding to the programs and initiatives are often located in separate computing systems and databases with different formats and standards, and the impact of different data and data sources on the effectiveness and consistency of a program or initiative can vary greatly. Organizations are not equipped for reliable, objective analysis of the effectiveness and trustworthiness of implementations of various programs and initiatives.

SUMMARY

In one aspect, various embodiments disclosed herein are related to a method of analyzing a protocol of an enterprise. The method may comprise accessing, via a processor, client resolution data including information regarding multiple resolutions. The client resolution data may be accessed from a plurality of databases. Each resolution may be associated with a claim from a respective client. Each resolution may include an identity of an agent and a resolution value. The method may comprise generating, via the processor, a resolution dataset. The resolution dataset may comprise an instance for each claim and variables for each instance. The variables may include the resolution value, the identity of the agent, an expected resolution value, and an identification of products provided by the enterprise and associated with the claim. The method may comprise applying, via the processor, an outlier detection model comprising one or more outlier analysis tests applied to the resolution dataset to identify abnormal resolutions. Applying the one or more outlier analysis tests may comprise analyzing at least one of the variables of each resolution and aggregating the resolutions based on at least one of the variables. The method may comprise providing, via the processor in a graphical user interface (GUI), an outlier response including indications of abnormal resolutions.

In another aspect, various embodiments disclosed herein are related to a computer implemented method of analyzing a protocol of an enterprise. The method may comprise accessing, via a processor, client resolution data including information regarding multiple resolutions. Each resolution may include an identity of an agent and a relief amount. The method may comprise generating, via the processor, a stratified sample dataset from the client resolution data. The stratified sample dataset may be stratified based on a categorization of the multiple resolutions. The method may comprise providing, via the processor, a summary of the stratified sample data set in a graphical user interface (GUI).

Various embodiments disclosed herein may relate to a system. The system may comprise a display configured to present a graphical user interface. The system may comprise a processor and program logic stored in memory and executed by the processor. The program logic may include auditing logic configured to perform specific operations. The logic may be configured to access client resolution data comprising information regarding multiple resolutions. The client resolution data may be accessed from a plurality of databases. Each resolution may be associated with a complaint or claim from a respective client. Each resolution may include multiple variables with corresponding values. The logic may be configured to perform an outlier analysis. To perform the outlier analysis, the logic (which may be audit logic) may be configured to determine outlying values of at least one of the variables within each resolution, and compile the resolutions having an outlying value into a summary. The logic may be configured to display, in the GUI, an outlier response comprising the summary.

These and other features, together with the organization and manner of operation thereof, will become apparent from the following detailed description and the accompanying drawings.

BRIEF DESCRIPTION OF THE DRAWINGS

The foregoing and additional features of the present disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
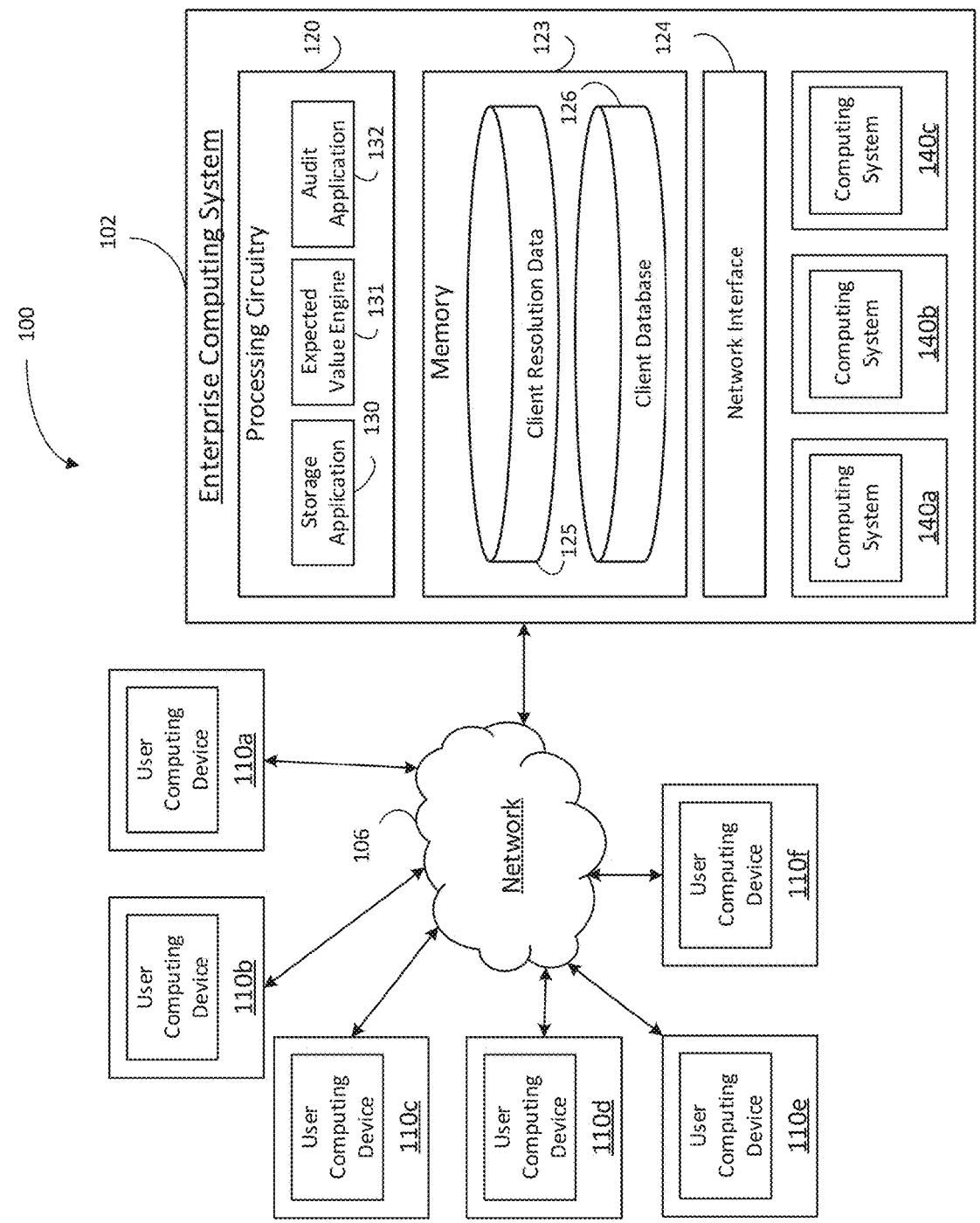
FIG. 1 depicts a block diagram of a protocol analysis system in accordance with various potential embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The present disclosure describes devices and methods for monitoring, analyzing, and providing a targeted output of results of protocols implemented by an enterprise. The enterprise may have multiple divisions, each with one or more computing systems, many user devices, and potentially disparate standards or practices. The many computing systems may have independent operations or functions or even be partially or wholly siloed (e.g., for security reasons), and may include many data sources which may be unconnected, not standardized, and/or otherwise including variable data types and formats. Implementing an enterprise-wide protocol, or otherwise a protocol that affects multiple such systems and data sources, may have inconsistent results and unintended consequences. Such results and consequences may result, for example, from unavailability or improper use of data and subjective application of applicable standards.

In various embodiments, the devices and methods described herein describe a technology platform for analyzing data of a protocol to determine the effectiveness of program or initiative, consistency by agents implementing the program or initiative, and results of the program or initiative. In some embodiments, the protocol analysis system includes multiple user devices that may each be accessed via an agent and an enterprise computing system associated with the enterprise. The user devices may be configured to capture correspondences between an agent (e.g., agent of the enterprise, which may include computerized or automated agents, such as chat bots, that may be trained via various machine learning techniques or artificial intelligence platforms) and clients, client's complaints or concerns, and a resolution of the client's complaints or concerns (e.g., a relief amount or monetary value paid to the client, or other resolution value). Information from each stage of the agent assisting the client (e.g., receiving an application for reimbursement, correspondence between the client and agent, and actual payment of a relief amount to the customer) may each be entered by the agent into a respective user device or automatically captured and stored within a respective database. As such, in order to analyze the program or initiative as a whole, the technology platform accesses and objectively analyzes varying information from multiple databases. In various embodiments, as used herein a resolution generally refers to a complaint or claim initiated by a client, handled by an agent, and the outcome of the complaint or claim (e.g., relief amount or other resolution value).

The enterprise computing system is a computing system that is associated with or owned by an enterprise. In some embodiments, the enterprise may include, for example, a financial institution, a government enterprise, or a corporate enterprise. The enterprise computing system is communicably coupled to the multiple user devices such that the enterprise computing system can receive and store client resolution data. For example, the client resolution data may include information regarding respective clients, their complaints or claims, correspondences between an agent and the client, and the respective resolutions (e.g., relief amount). Information from each stage of the agent assisting the client (e.g., receiving an application for reimbursement, correspondence between the client and agent, and actual payment of a relief amount to the client) may each be entered by the agent into a respective user device or automatically captured and stored within a respective database. The enterprise computing system is configured to access the client resolution data (e.g., from the respective databases), generate a stratified sample data set and provide the stratified sample data set via a graphical user interface to one or more users (e.g., management personnel, administrator, or auditors). The users may then use the stratified sample data set to analyze the effectiveness or consistency of implementation of a particular program or initiative.

Moreover, the enterprise computing system may also access the client resolution data (e.g., from the respective databases), generate a dataset including fields (e.g., multiple variables) for each resolution in the client resolution data, apply an outlier detection model to the data set, and provide an outlier response via graphical user interface to the management personnel. The outlier detection model may include one or more outlier analysis tests that are each specifically designed such that any abnormalities or outliers of corresponding resolutions that may not have been included in the sample data set are flagged in the outlier response such that the abnormalities are provided to management personnel. In this way, the enterprise computing system can analyze data from multiple databases associated with a program or initiative of an enterprise in order to determine particular areas of the program or initiative that are being implemented inconsistently, unfairly, or not as intended and flag those respective areas to an administrator or other agent to effectively improve the efficacy of the protocol as a whole.

Referring now to FIG. 1, a block diagram of a protocol analysis system 100 is depicted in accordance with illustrative embodiments. The protocol analysis system 100 includes an enterprise computing system 102 and multiple user-operated computing devices 110a-f configured to communicate via a network 106. Enterprise computing system 102 may further comprise computing systems 140a-c (of, e.g., various branches, offices, outposts, and/or other divisions), which may communicate with each other (e.g., via network 106 or other network) or may not communicate with each other. Computing systems 140a-c may each comprise one or more databases with various data generated protocol implementations.

The multiple user computing devices 110a-f may include one or more personal computing devices, desktop computers, mobile devices, or other computing devices that may be utilized or accessed by clients, agents, or other users. In general, the enterprise computing system 102 may receive inputs from clients, agents, or other users via the user computing devices 110a-e, monitor the inputs or variables within the system 100 over time, and store a value for each time period and each monitored input. In an embodiment, the stored values and the monitored inputs from the clients, agents, or other users are in the form of variables that may be received, stored, and/or accessed by the enterprise computing device 102 (e.g., one or more computing systems 140a-c). One or more of the computing systems 140a-c may include servers that can, for example, serve websites to one or more of the computing devices 110a-f. In some embodiments, each of the user computing devices 110a-f and computing systems 140a-c may include a processor, memory, communications hardware for transmitting and receiving data, and a display for presenting a graphical user interface (GUI). The enterprise computing device 102 may be configured to output the GUI onto the display of any of the user computing devices 110a-f (and/or computing systems 140a-c). For example, the enterprise computing device 102 may be configured to provide instructions (e.g., HTML instructions) to one or more of the user computing devices 110a-e (and/or computing systems 140a-c) that cause or allow the respective user computing device 110a-f to display the GUI (e.g., or information of the GUI) generated by the enterprise computing device 102.

The network 106 may be any type of type of network. For example, the network 106 may be a wireless network interface (e.g., Internet, WI-FI, etc.), a wired network interface (e.g., Ethernet), or any combination thereof. The network 106 is structured to permit the exchange of data, values, instructions, messages, and the like between and among various components of FIG. 1.

The enterprise computing system 102 includes processing circuitry 120, a memory device 123, and a network interface 124. The network interface 124 is structured to enable the enterprise computing system 102 to connect to and to exchange information over the network 106 with, for example, the mobile device 101. The network interface 124 may be coupled to the processing circuitry 120 in order to enable the processing circuitry 120 to receiving and transmit messages, data, and information via the network 106.

The memory 123 includes a client resolution database 125 and a client database 126. The client resolution database 125 and the client database 126 are structured as repositories for information in varied formats. In this regard, the client database 126 is configured to store, hold, and maintain information for a plurality of clients of the enterprise. For example, the client database 126 may store information such as client information (e.g., names, addresses, phone numbers, and so on), preferred branch locations of the enterprise, products provided by the enterprise and used by the client, or other information regarding the relationship between the enterprise and the client.

The client resolution database 125 is configured to store, hold, and maintain client resolution data. For example, a client may have a complaint, claim, or concern or have an application requesting relief under a program or initiative implemented by the enterprise. A program or initiative may include monetary relief for clients that were overcharged or otherwise damaged via a mistake (e.g., mistake in software or calculation in charges made by the enterprise, or mistake of non-regulatory compliance) by the enterprise. The information contained in the client resolution database 125 may include client resolution data that includes multiple resolutions. Each of the resolutions may be associated with an issue, complaint, or concern of a respective client. For example, information associated with each resolution may include information regarding the client, information regarding the complaint or concern and associated products used by the client that were provided from the enterprise, the expected value of a resolution payment generated from the expected value engine 131, an actual payment value made to the client for the complaint or concern, any communication between the client and the enterprise (e.g., text messages or emails), and/or the agent associated (e.g., an agent ID number) with the resolution for the client. In some embodiments, the information associated with each resolution may be stored in multiple databases within the customer resolution database 125. For example, the communications between the client and the enterprise may be stored in a first database, information regarding the complaint or concern and associated products may be stored in a second database. Moreover, as indicated above, information regarding products, accounts, and prior transactions of each client may be stored in a third database (e.g., the client database 126). The client resolution database 125 serves as a repository that documents the issues of respective clients and associated outcomes of the issues. The client resolution data may be used by the enterprise computing system 102 to determine or analyze the consistency, efficacy, and effectiveness in remediation of the complaints, claims, or concerns of respective clients.

The processing circuitry 120 may include one or more processors and non-transitory machine readable medium that when executed by the processor, causes the processor to perform or assist in performing any of the methods, operations, or steps described herein. The processing circuitry 120 includes a storage application 130 that is designed to receive information (e.g., from the multiple user computing devices 110a-f and/or computing systems 140a-c) and store the information within the memory device 123. In some embodiments, the storage application 130 may store the information within the memory device 123 in an ordered structure where each complaint or concern is an instance with multiple data fields associated with that instance. The data fields may include messages (e.g., text messages, emails, or textualized voice phone calls) between the client and the enterprise, a set of products provided from the enterprise that the client is filing the claim regarding, a damage amount claimed by the client regarding each of the set of products, an agent identification field (e.g., agent identification number, or name) that handled or opened the claim, a relief amount (e.g., amount paid to the client), and/or additional categories thereof.

The processing circuitry 120 also includes an expected value engine 131 that is designed to calculate expected values for payment values based on respective complaints from the clients and program or initiative rules or guidelines. That is, the expected value engine 131 may include a model that is designed to receive as inputs the complaints or concerns of respective clients and output an estimated value of a payment for the resolution to the complaints or concerns. The model may be generated or updated based on a particular goal associated with a program, initiative, or internal policies of the enterprise. For example, the model may receive as an input information regarding the set of products associated with the claim and a damage amount claimed by the client regarding each of the set of products and/or other information in the claim and output a total relief amount based on the specific information in the claim. In some embodiments, the model is based on a decision tree that relates the inputs to damages for which the program wishes to compensate the client. In various embodiments, the model may apply one or more machine learning techniques, and may be trained on datasets generated using prior resolution data. In some embodiments, the expected value engine 131 may be a computer application that is provided to one or more of the user computing devices 110*a-f* and configured to be downloaded, launched, or executed via the respective user computing devices 110*a-f*. For example, the expected value engine 131 may be assessable to an agent on a user computing device 110*a* and provide the agent with an estimate or guideline of the expected payment value based on complaints or concerns of a client. Further, the storage application 130 may receive from the user computing device 110*a* and store within the memory device 123 client resolution data. The client resolution data may include information regarding multiple resolutions over a period of time.

The processing circuitry 120 may also include an audit application 132. The audit application 132 may be configured to access the client resolution data and/or other client data, generate a stratified sample data set of particular resolutions pertaining to one or more clients over a time period, and provide a summary of the stratified sample data set via a GUI on one or more the user computing devices 110*a-f*. In some embodiments, the summary is fed to trained machine learning models that analyze the data to identify various characterizations or trends, to generate various metadata, or otherwise provide insight into the data. The summary may include analyses of the resolutions within the time period, a breakdown of the categories that were associated with the resolutions, and/or a list of particular resolutions that are representative of the client resolution data. That is, the audit application 132 may access or receive the client resolution data from the multiple databases memory device 123, analyze the client resolution data by parsing through data associated with each resolution (e.g., accessed from the multiple databases), categorize the resolutions based on one or more of the data fields (e.g., an agent, a particular product associated with the respective resolution, a particular business group associated with the respective resolution, or any other parameter that is included as a field or variable within a resolution), and generate a stratified sample based on the number resolutions associated with the categories of the parameter. Additionally or alternatively, the audit application 132 may include an outlier detection model that is configured to perform one or more outlier tests on the client resolution data to determine and/or flag particular resolutions within the client resolution data that may need additional attention from an auditor, an administrator, or management personnel. For example, the outlier analysis tests may identify potential issues or outliers of every resolution within the client resolution data and the audit application 132 may generate and provide an outlier response via a GUI on a user device 110*a* that graphically indicates the identified issues or outliers. Additional details regarding the stratified data set and the audit application 132 are discussed below in reference to FIGS. 2 to 4. Additional details regarding the outlier analysis tests and outlier responses are discussed herein in reference to FIGS. 5 to 15.

As used herein, the terms "application," "computing device," "computing system" and/or "engine" may include hardware structured to execute the functions described herein. In some embodiments, each respective "application," "computing device," "computing system" and/or "engine" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "application," "computing device," "computing system" and/or "engine." In this regard, the "application." "computing device." "computing system" and/or "engine" may include any type of component for accomplishing or facilitating achievement of the operations described herein. For example, a circuit as described herein may include one or more transistors, logic gates (e.g., NAND, AND. NOR, OR, XOR, NOT, XNOR), resistors, multiplexers, registers, capacitors, inductors, diodes, wiring, and so on).

The "application," "computing device," "computing system" and/or "engine" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., application A and application B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, an "application," "computing device," "computing system" and/or "engine" as described herein may include components that are distributed across one or more locations. Further, it is to be appreciated that the terms "server," "server system," "memory," "memory device," and "cloud based computing" are all understood to connote physical devices that have a structure. It should be understood that no claim element herein is to be construed under the provisions of 35 U.S.C. § 112(f), unless the element is expressly recited using the phrase "means for."

Figure 2:
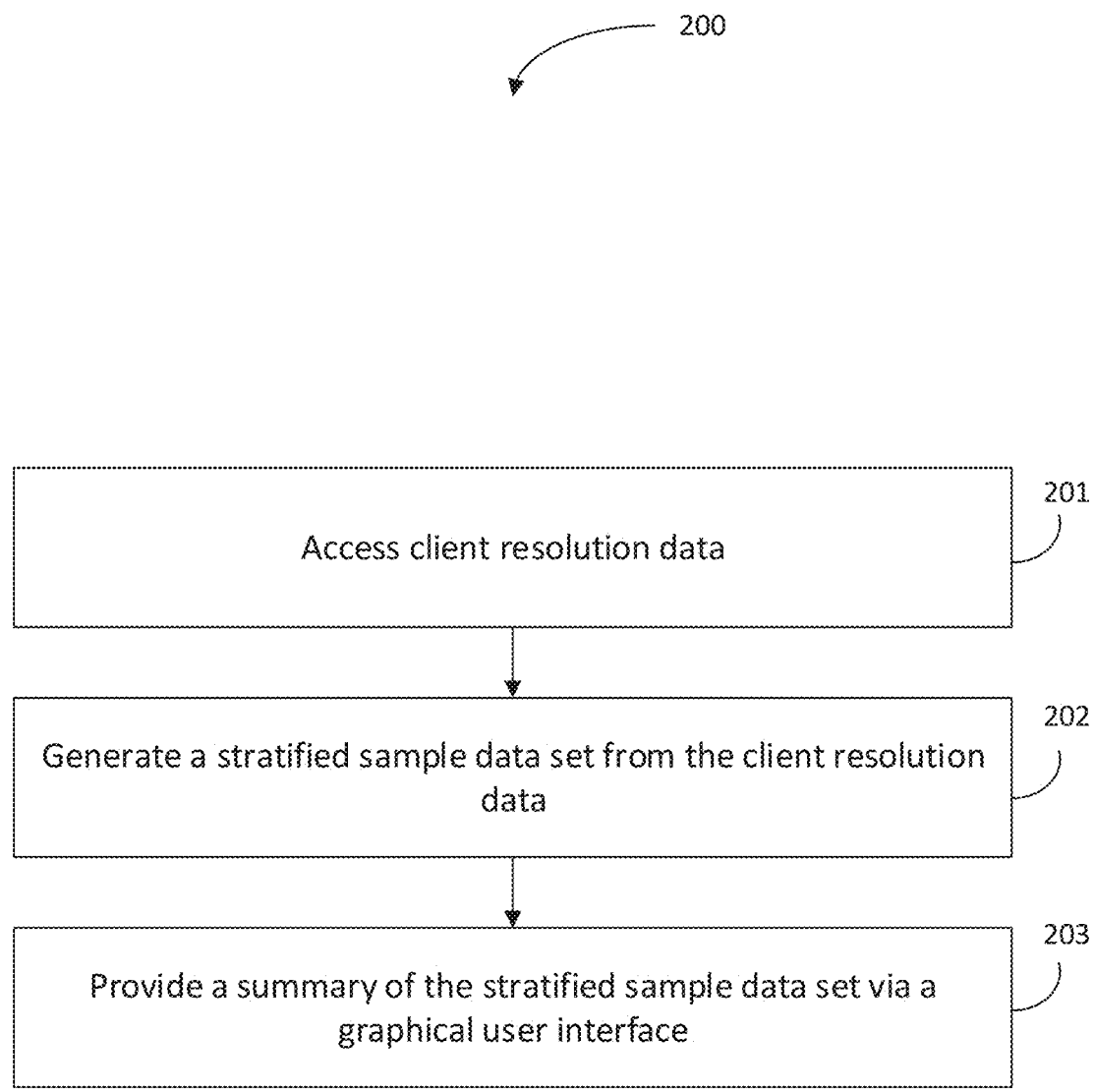
FIG. 2 depicts a flow diagram of a method of operation of a protocol analysis system in accordance with various potential embodiments.

Referring now to FIG. 2, a flow diagram of a method 200 of operation of a protocol analysis system is depicted in accordance with illustrative embodiments. The method 200 may be implemented by the enterprise computing system 102 such that the enterprise computing system 102 is able to determine a stratified sample data set and provide information regarding the stratified sample data set via an interactive GUI on one or more user computing devices 110a-f and/or computing systems 140a-c.

In an operation 201, the enterprise computing device 102 accesses the client resolution data. The client resolution data may be stored within a client resolution database 125 and/or the client database 126 and include information regarding multiple resolutions for multiple clients. Information associated with each resolution may include multiple variables within the database. For example, each resolution may be associated with a complaint or claim initiated via a respective client and include a variable pertaining to a particular program or initiative associated with the respective resolutions (e.g., a remediation program for mistaken charges, a remediation program for untasteful sales tactics, a remediation program based on a lawsuit, etc.), a business group of the enterprise associated with respective resolutions, client information associated with respective resolutions (e.g., name, length of client relationship with the enterprise, etc.), an estimated value of remediation (e.g., an expected relief amount based on the expected value engine 131), information regarding the particular products associated with the respective resolutions (e.g., business loans, consumer loans, credit cards, deposit/money movement, virtual banking, etc.), an agent associated with the respective resolutions (e.g., agent ID variable or field), notes or comments of the respective resolution (e.g., text from messages between the client and agent or comments entered by the agent into a user computing device stored as strings), and/or an actual value of monies paid to the client for remediation (e.g., relief amount). In some embodiments, the enterprise computing system 102 accesses a portion of the client resolution database based on one or more parameters. For example, the enterprise computing system 102 may access, query, or retrieve information from the databases regarding multiple resolutions that were resolved (e.g., indicated via a variable associated with the complaint that the resolution has been closed) within a particular time period (e.g., a particular week, month, quarter, year, etc.) and regarding the particular program or initiative (e.g., the remediation program for mistaken charges indicated as a string or an integer).

In an operation 202, the enterprise computing device 102 generates a stratified sample data set from the accessed client resolution data. The enterprise computing system 102 may stratify the sample set based on a particular parameter or variable associated with the resolutions. The stratification helps ensure that the sample data set is representative of all of the resolutions within the client resolution data. For example, the client resolution data may include information regarding 45,549 resolutions and the sample data set may be stratified based on the variable associated with a particular product provided by the enterprise. Accordingly, the enterprise computing system 102 may analyze each resolution to determine the categories represented within the selected variable (e.g., product variable) and determine the applicable categories (e.g., a first, second, third, fourth, and fifth product). The enterprise computing system 102 may then analyze or step through the resolutions in order to categorize and count each resolution corresponding to each determined category. For example, the enterprise computing system 102 may determine that of the 45,549 resolutions, 2,225 are associated with a first product (e.g., business or commercial loan), 4,158 are associated with a second product (e.g., consumer loan), 21,237 are associated with a third product (e.g., credit card), 17,818 are associated with a fourth product (e.g., a deposit/money movement product), and 111 are associated with a fifth product (e.g., a virtual banking product). The enterprise computing system 102 may then generate a sample data set based on a proportion of the amount of resolutions in each category (e.g., in this example, each product category) and a requested sample data set size. The sample data set size may be a user input or may be programmed into memory based on a statistical analysis so that the sample data size will accurately represent the client resolution data and/or constraints of the enterprise to be able to analyze the resolutions within the sample data set. Continuing with the example, the sample data size may be 132. Accordingly, the enterprise computing system 102 may randomly select resolutions in each category such that a proportional amount of resolutions from each category are represented in order to generate the stratified sample data set. For example, the enterprise computing system 102 may include 6 resolutions associated with the first product because the first product (e.g., business or loan) represents 4.9% of the total resolutions in the client database (e.g., 2,225 divided by 45,549) and 4.9% of the sample size (e.g., 132) is 6.4 resolutions and rounded is 6 resolutions. Moreover, the enterprise computing system 102 may also determine or randomly select alternative resolutions associated with the first product such that if there is an issue with one of the selected samples, that the alternatives may be substituted in. The enterprise computing system 102 may store each resolution (and, e.g., alternatives) of the sample data set within a new database that may be communicated or/accessed by a user or include pointers for each resolution to the respective selected resolution within the client resolution database 125. In this way, the enterprise computing system 102 is able to generate a stratified sample data set of the client resolution data, which provides a more accurate representation of the client resolution data.

In an operation 203, the enterprise computing system 102 provides a summary of the stratified sample data set via a GUI. For example, the enterprise computing system 102 may provide information regarding the stratified sample data set to a user computing device 110a with instructions that cause the information regarding the stratified sample data set to display on the user computing device 110a (e.g., via an application running on the user computing device 110a such as a browser application). In some embodiments, the enterprise computing system 102 provides the summary in response to a request and authorization received from the user computing device 110a. For example, the enterprise computing system 102 may only provide the summary to particular user accounts such as user accounts having administrator permissions.

The summary may include a list of the randomly selected resolutions in the stratified sample data set and/or the alternative resolutions. The summary may also include a breakdown of the stratified sample data set. An example of the breakdown of the stratified sample data set is discussed below in reference to FIG. 3. The summary may assist with the analysis of an administrator about whether the program is being effectively implemented or if the resolutions are not being implemented as intended. For example, the administrator may view or interact with the resolutions in the stratified data set to gain a general understanding of how the resolutions are being handled or completed. Additionally, the administrator may view or interact with the breakdown of the stratified sample data set to gain an understanding of how issues with particular products are being resolved under the program. Without the enterprise computing system 102 and the associated method 200, the administrator may not be able to gauge the effectiveness or consequences regarding the implementation of the program or initiative and, consequently, the program could possibly damage the enterprise's reputation, harm regulatory compliance, and reduce client satisfaction.

Figure 3:
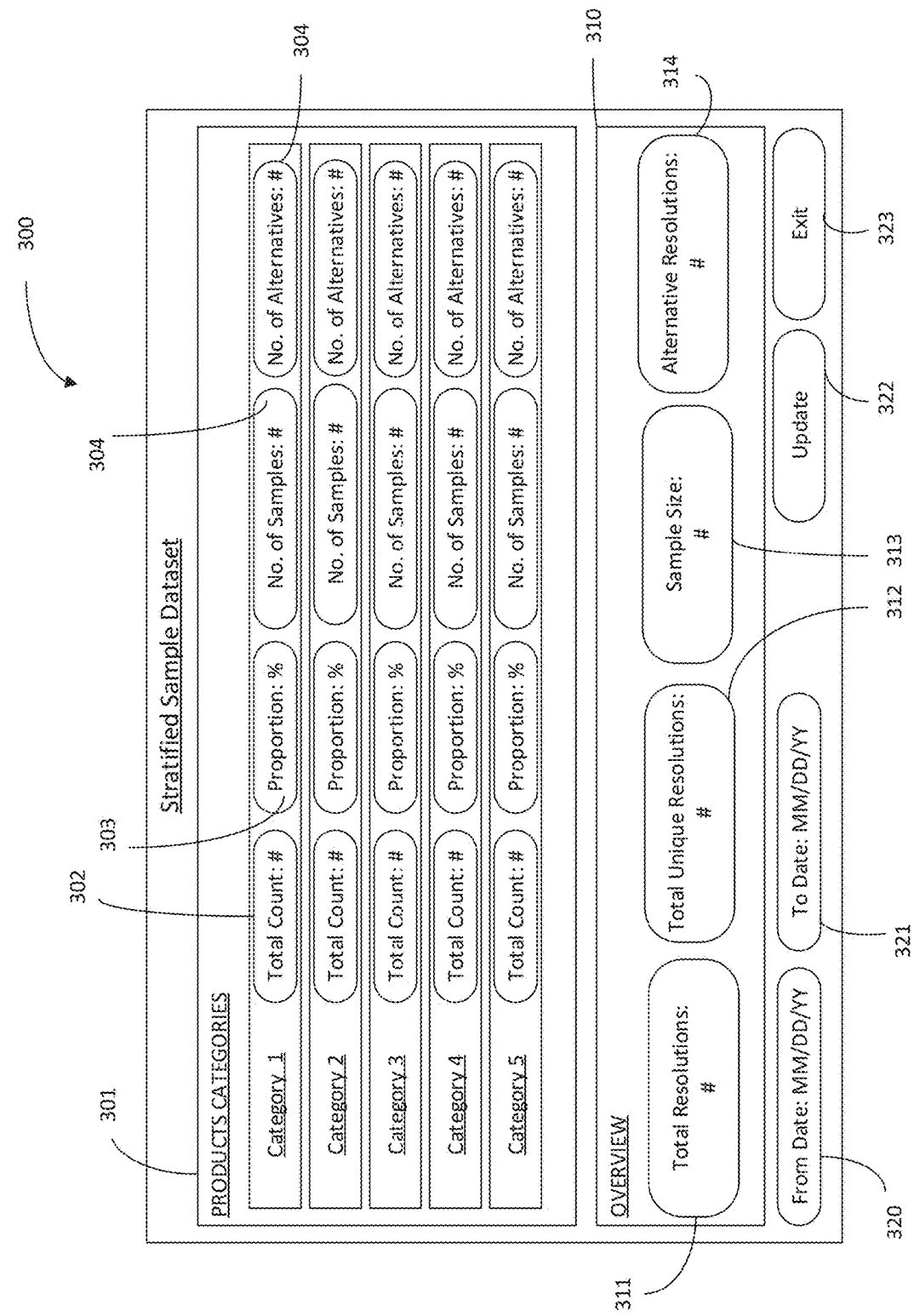
FIG. 3 is an example of a summary being presented on a graphical user interface in accordance with various potential embodiments.

Referring now to FIG. 3, an example of a summary 300 being presented on a graphical user interface (GUI) is depicted in accordance with various illustrative embodiments. As discussed above, FIG. 3 depicts a GUI associated with the stratified sample data set. In this example, the client resolution data was stratified according to a product category 301 associated with each resolution. In this example, the identified categories associated with the products category 301 variable include a Category 1 (e.g., business loans), Category 2 (e.g., consumer loans). Category 3 (e.g., credit cards. Category 4 (e.g., deposit accounts), and Category 5 (e.g., virtual banking products). The summary 300 includes an indication of the total count corresponding to the number of resolutions in each category (e.g., a first indicator 302 for Category 1), an indication of the proportion of the category to the total amount (e.g., a second indicator 303 for Category 1), an indication of the number of sample resolutions identified (e.g., a third indicator 304 for Category 1), and an indication of the number of alternative resolutions identified (e.g., indicator 304 for Category 1). The summary 300 may also include an overview section 310 that indicates information regarding the client resolution data. The overview section 310 includes an indication of the total resolutions identified within the client resolution data (e.g., via indicator 311), an indication of the total number of unique resolutions identified of the total resolutions (e.g., via indicator 312), the sample size of the stratified data set (e.g., via indicator 313), and an indication of the total alternative resolutions selected for the stratified sample data set (e.g., via indicator 314). The summary 300 may be interactive in that a user may select, for example, indicator 304 via an input device (e.g., by touching a touchscreen display), and the selection causes the GUI to, for example, re-direct and display a list of the selected resolutions corresponding to the resolutions selected for the business group category, triggers a transmission to or response by the enterprise computing system 102, etc.

Moreover, the GUI includes an indication of the constraints of the client resolution data accessed by the enterprise computing system 102. For example, the GUI includes an indication of a "from" date (e.g., via indicator 320) and an indication of a "to" date (e.g., via indicator 321) such that only resolutions completed between the from and to dates are included within the client resolution data and the stratified data set. In some embodiments, indicator 320 may be selected via a user input that allows a user to change or update the "from" date. Similarly, in some embodiments, the indicator 321 may be selected via a user input that allows for the user to change or update the "to" date. The GUI also includes an update icon 322 that may be selected by a user to cause the enterprise computing system 102 to perform method 200 in order to update the GUI. For example, after updating the "from" and "to" date (e.g., or any of the other indicators), a user may select the update icon 322 that causes the enterprise computing system 102 to perform method 200 based on the updated information input via the user into the respective indicator. The GUI also includes an exit icon 323 that may be selected by a user that causes a respective user computing device 110a to exit or close the GUI.

It is to be appreciated that the GUI illustrated in FIG. 3 is meant to be one example of a potential GUI. In some embodiments, the summary may be presented via a GUI on a user device in the form of either a spreadsheet, a webpage, or other application page. Additionally or alternatively, the summary may also include a list of each resolution selected in column 206. In another example, each category may be selectable (e.g., include a hyperlink) that, when selected, may cause the user computing device 110a to display a list of resolutions corresponding to the selected category. The list of resolutions may include data corresponding to each field or variable of each or the resolutions and/or additional information such as text, communications between the enterprise and the client, or comments entered by an agent during the resolution. Moreover, in other examples, the summary may also be presented along with one or more of the outlier responses discussed herein to aid the administrator with accessing the effectiveness or consistency of the resolutions (e.g., and thereby the program or initiative).

In various embodiments, a selection in one GUI (such as any of the GUIs discussed or illustrated in this disclosure) may change or switch which GUI is presented, or the selection may modify what functionality or information is provided in a particular GUI. In certain embodiments, various interactive inputs such as selection of a selectable icon, "hovering" over the icon with a selector (e.g., a pointer controlled by a mouse or other input device), "pressing and holding" at certain points on a GUI being displayed on a touchscreen, various gestures, or other inputs may provide additional functionality or information. For example, touching or hovering over an icon may generate a graphic (e.g., a graph showing changes or trends over time or details on an outlier) that is displayed on the GUI (near the icon or elsewhere). Certain selections may generate an input field or provide further optional selections (e.g., in the form of overlaid icons, fields, or imagery). In some embodiments, elements may be dynamically generated in a cascading fashion, such that, for example, a first activation in a first set of selectable functions or options generates a second set of selectable functions or options, a second activation in the second set of functions or options generates a third set of functions or options, and so on.

Figure 4:
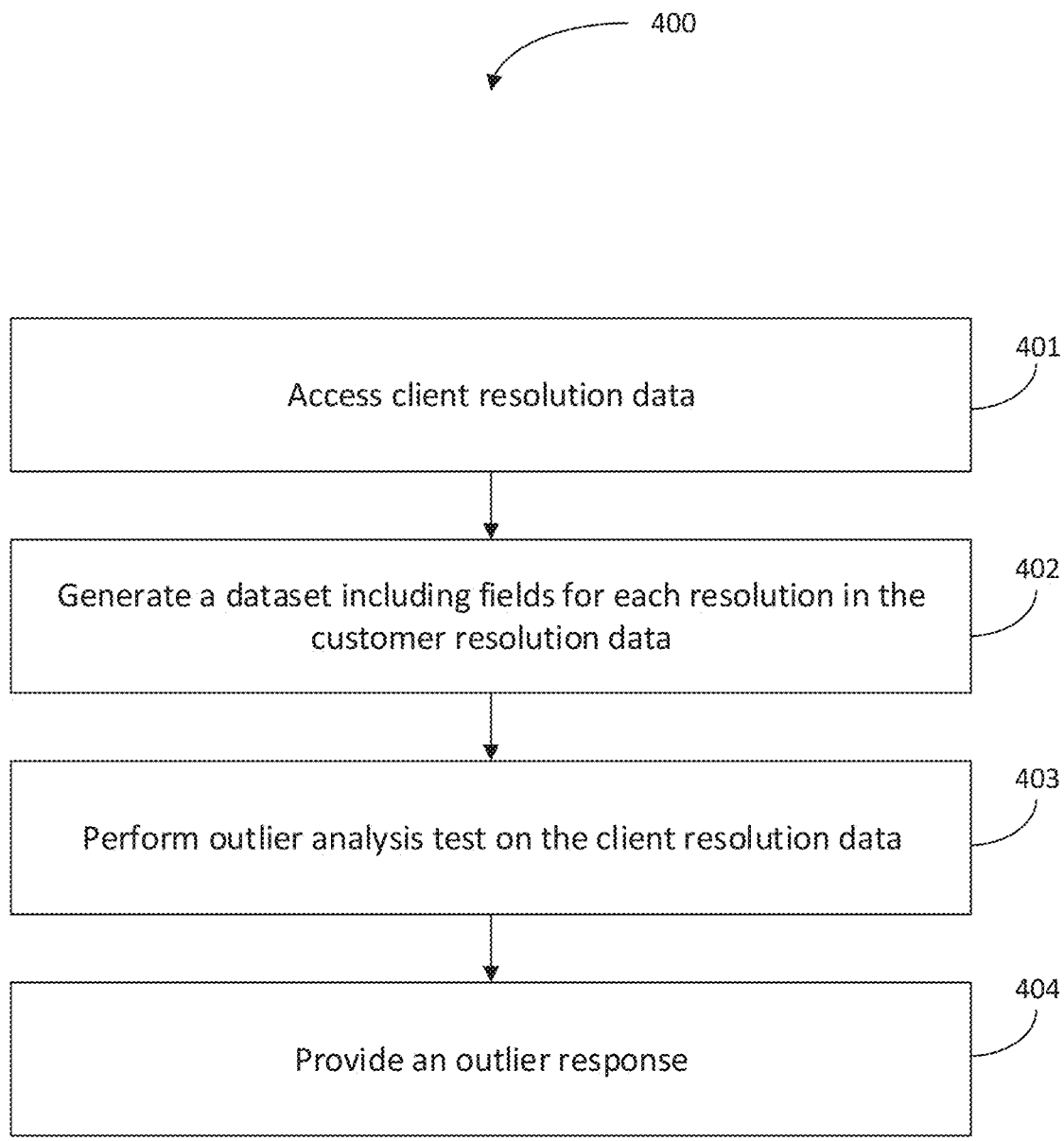
FIG. 4 depicts a flow diagram of a method of operation of a protocol analysis system in accordance with various potential embodiments.

Referring now to FIG. 4, a flow diagram of a method 400 of operation of a protocol analysis is depicted in accordance with various illustrative embodiments. The method 400 may be implemented by the enterprise computing system 102 such that the enterprise computing system 102 is able to analyze each resolution in the client resolution data, identify the outliers or abnormalities, and provide a GUI having an outlier response that includes indications of the identified outliers or abnormalities.

In an operation 401, the enterprise computing system 102 accesses client resolution data from multiple databases stored by the enterprise computing system 102 (which may be in one or more of the computing systems 140a-c). The enterprise computing system 102 may access the client resolution data in a similar manner to as described in reference to operation 201. The enterprise computing system 102 may query, retrieve, or access the client resolution data from the client resolution database 125 (e.g., multiple databases or data sets within the client resolution database 125, the client database 126, and/or one or more computing systems 140a-c) according to one or more parameters. For example, the enterprise computing system 102 may access the client resolution data by querying the client resolution database 125 for resolutions that have been completed (e.g., indicated via a variable of the resolution or indicated by a value in a variable indicating a relief amount), between a selected date range (e.g., selected date range received via a user input), and/or other parameters either defined within memory or selected via a user input (e.g., input via a user computing device 110a-f and/or and computing system 140a-c).

In an operation 402, the enterprise computing system 102 generates a data set including multiple various fields for each resolution accessed with the client resolution data. For example, the enterprise computing system 102 may analyze or parse through comments or text (e.g., correspondences, comments from the agent, comments auto-generated from the expected value engine) associated with each resolution to determine and/or create the database having fields (e.g., pre-defined variables) for each resolution within the client resolution data. Comments or text may include excerpts or portions of (e.g., spoken phrases in) discussions between a chat bot and a client. Analysis of the comments or text may involve application of natural language processing (NLP) techniques to the comments or text. Further, the enterprise computing system 102 may access other information such as the client information from the client database 126 in order to cross-reference, complete, or verify information associated with a resolution and the actual products, charges, or payments made from the client. In some embodiments, the database includes a data structure of an overview variable (e.g., resolution number X) and one or more pre-defined data fields under the overview variable (e.g., associated agent, total relief amount, product categories associated with the resolution, relief amount categories or relief amounts associated with each product category, expected relief amount generated from the expected value generator, or other information such as monetary damage claimed by the client or actual interest paid from the client). The enterprise computing system 102 may search, analyze, or parse the information throughout each of the available databases in order to populate the multiple data fields. It is to be appreciated that this example is not meant to be limiting and in other applications other data structures or variables may be used depending on the application.

In an operation 403, the enterprise computing system 102 applies an outlier detection model on the generated data set. Additionally or alternatively, the enterprise computing system 102 may apply the outlier detection model on the raw client resolution data. The outlier detection model may include one or more outlier analysis tests each configured to identify particular outlying resolutions. For example, the enterprise computing system 102 may follow a particular set of rules to search for inconsistent values, outlying values, or other indications that a resolution is an outlier or abnormal relative to an expected resolution. The enterprise computing system 102 may flag an abnormal or outlying resolution and populate the resolution into a message (e.g., an outlier response) that is configured to be displayed via a user computing device 110a-f. Examples of various outlier analysis tests are discussed below in reference to FIGS. 5 to 15.

In an operation 404, the enterprise computing system 102 provides an outlier response. For example, the outlier response may include a GUI, a push notification, a message, or an email configured to notify an administrator of identified abnormal resolutions. The outlier response may indicate that a particular agent is resolving issues or complaints inconsistently or not according to expected values (e.g., providing inconsistent monetary relief to clients), that particular resolutions had unexpected values (e.g., the resolution was a payment of $5,000 instead of an expected $500), or that the resolutions are otherwise being carried out in unexpected ways. Accordingly, the method 400 allows the enterprise computing system 102 to analyze all of the resolutions and provide a targeted outlier response, which allows for an administrator to identify particular issues with how the resolutions are being implemented and thereby increase the effectiveness and consistency of resolutions in the future. As a result, the enterprise computing system 102 improves the ability for the computer to analyze data associated with a program or initiative, which may allow the enterprise to avoid regulatory issues and improve client experiences. Additional details and examples of outlier responses are discussed below in reference to FIGS. 5 to 15. As used herein, an unexpected value is a value, such as an outlier, that deviates significantly from other observations or otherwise from what is deemed to be normal or common. For example, an unexpected value may vary by a predetermined number of standard deviations (e.g., 2, 3, or 4) from a mean value (sometimes referred to as a z-score).

Figure 5:
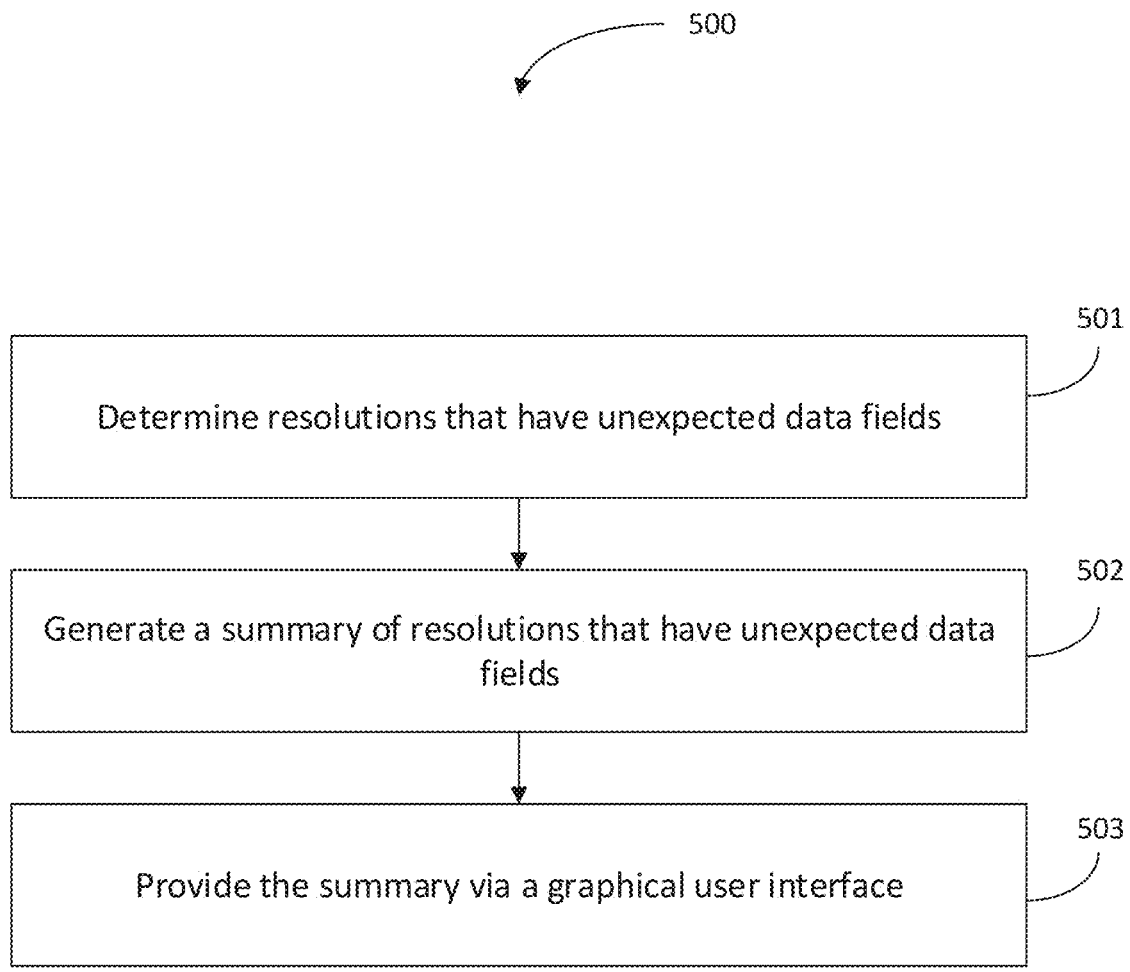
FIG. 5 depicts a flow diagram of a method of operation of a first outlier analysis test in accordance with various potential embodiments.

Referring now to FIG. 5, a flow diagram of a method 500 of operation of a first outlier analysis test of a potential outlier detection model is depicted in accordance with various embodiments. The method 500 is an example of an outlier analysis test as described in reference to operation 403. In particular, the first outlier analysis test may determine and/or flag any resolutions that have unexpected data fields.

In an operation 501, the enterprise computing system 102 determines, identifies, and/or flags resolutions that have unexpected data fields. For example, the enterprise computing system 102 may analyze each resolution for data fields that have unexpected values within a selected or identified variable (e.g., selected via a user input). The unexpected values may be determined based on particular rules stored within the enterprise computing system 102. As an example, if a resolution has a value in the total relief amount variable that is greater than a lower threshold (e.g., $0), then all of the other fields or variables in the data structure of the resolution should be populated. If the other fields or variables in the data structure are not populated, then the enterprise computing system 102 may determine that the resolution includes incomplete or unexpected data fields. As another example, if the total relief amount variable has a value at or below the lower threshold (e.g., $0), then all of the other fields in the data structure should not be populated. The rules allow the enterprise computing system 102 to search for, identify, and flag the resolutions that may have an issue (e.g., over payment, under payment) and alerts the administrator to potential inconsistencies or errors.

In an operation 502, the enterprise computing system 102 generates a summary of resolutions that have unexpected data fields. The summary may include a list of all of the resolutions that have unexpected data fields, a generalized outline of the number of cases that have a relief amount above the lower threshold and have all fields populated, some fields populated, or no fields populated, and/or a generalized outline of the number of cases that have a relief amount at or below the lower threshold and have all fields populated, some fields populated, or no fields populated. The summary may provide an administrator with an indication of which resolutions have likely been inconsistently handled and/or to revisit the resolutions in order to correct them.

In an operation 503, the enterprise computing system 102 provides the summary to a user computing device. For example, the enterprise computing system 102 may provide instructions or a program to the user computing device that is configured to cause the user computing device to display the summary. In some embodiments, the summary may include more general (e.g., a statistical overview) or more particular (e.g., a particular list with the data fields of each resolution) information regarding the resolutions that have unexpected data fields. In some embodiments, the summary is interactive such that more general information (e.g., a statistical overview) includes links that cause the user computing device 110*a* to display more particular information (e.g., a particular list with the data fields of each resolution) when selected. The GUI allows for the user to seamlessly interact with the enterprise computing system 102 in order to receive and analyze data generated by the enterprise computing system 102 at various levels of complexity in order to determine the effectiveness or consistency of the resolutions and over-arching program or initiative.

Figure 6:
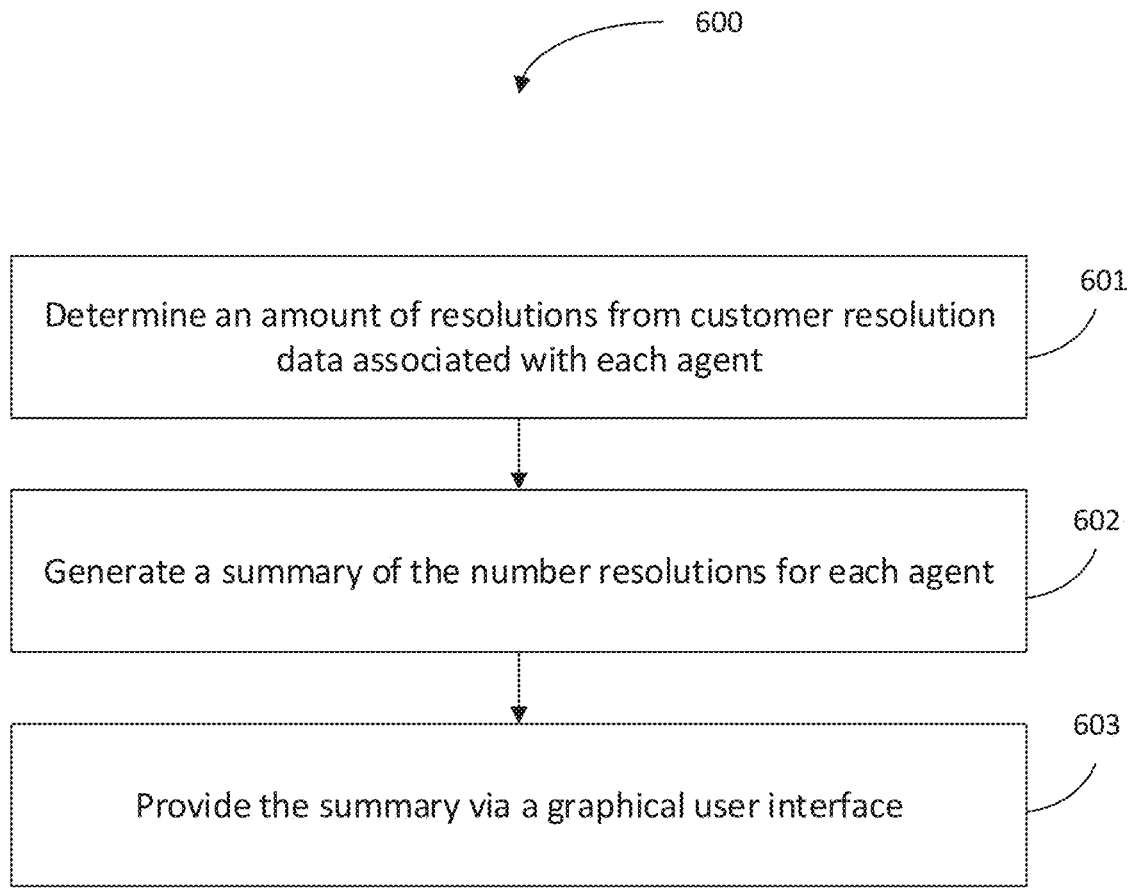
FIG. 6 depicts a flow diagram of a method of operation of a second outlier analysis test in accordance with various potential embodiments.

Referring now to FIG. 6, a flow diagram of a method 600 of operation of a second outlier analysis test is depicted in accordance with various potential embodiments. The method 600 is an example of an outlier analysis test as described in reference to operation 403. In particular, the second outlier analysis test may determine the amount of resolutions performed by each agent and provide a summary thereof.

In an operation 601, the enterprise computing system 102 determines an amount of resolutions in the client resolution data associated with each agent. For example, the enterprise computing system 102 may parse through the resolutions within the client resolution data, identify an agent associated with resolution (e.g., agent that handled the resolution). The agent may be identified via a unique agent identification number that is populated under a corresponding variable. The enterprise computing system 102 may then determine or count the number of resolutions associated with each agent. For example, a first agent may be determined have handled 4 resolutions, a second agent may be determined to have handled 18 resolutions, and a third agent may be determined to have handled 300 resolutions. In some embodiments, each of the agents may be located in different geographic locations or otherwise be associated with a particular location of the enterprise. In the case of chat bots or other automated agents, each agent may have a different build, version, implementation, or customization. Each agent (or build, version, implementation, or customization thereof) may be identified by a unique agent identifier.

In an operation 602, the enterprise computing system 102 generates a summary of the number of resolutions correspond to each agent. The summary may include pre-defined ranges, a graph, or a list of each agent and the corresponding amount of resolutions handled. In some embodiments, the list of each agent may be ordered from lowest resolutions to highest resolutions or vice versa such that an administrator can easily identify any outliers. In an example, the summary may include a breakdown of the number of resolutions corresponding to each agent. For example, the summary may include a histogram or chart that identifies the number of agents that have a count of resolutions between pre-defined ranges. In some embodiments, the summary is interactive in that the pre-defined ranges in the histogram or chart may be selectable such that, when a range is selected, the GUI is re-directed and displays particular information regarding each agent within the selected range. Further, the agents may be selectable such that, when a particular agent is selected, the GUI is re-directed and displays information regarding each resolution handled by the selected agent. In this way, the interactive summary improves the ability for the system to interact with a user (e.g., an administrator).

In an operation 603, the enterprise computing system 102 provides a GUI of the summary. For example, the enterprise computing system 102 may transmit information regarding the number of resolutions handled by each agent to a user computing device 110*a* with instructions that cause the user computing device 110*a* to display the GUI and thereby the summary. In some embodiments, the enterprise computing system 102 may transmit a spreadsheet or other document to the user computing device 110*a* via an email or webpage that, when selected, causes the user computing device 110*a* to display the summary of the number of resolutions that correspond to each agent. An example of the summary is depicted and discussed in reference to FIG. 7. In other embodiments, the summary may include additional or different information regarding the number of resolutions handled by each agent.

Figure 7:
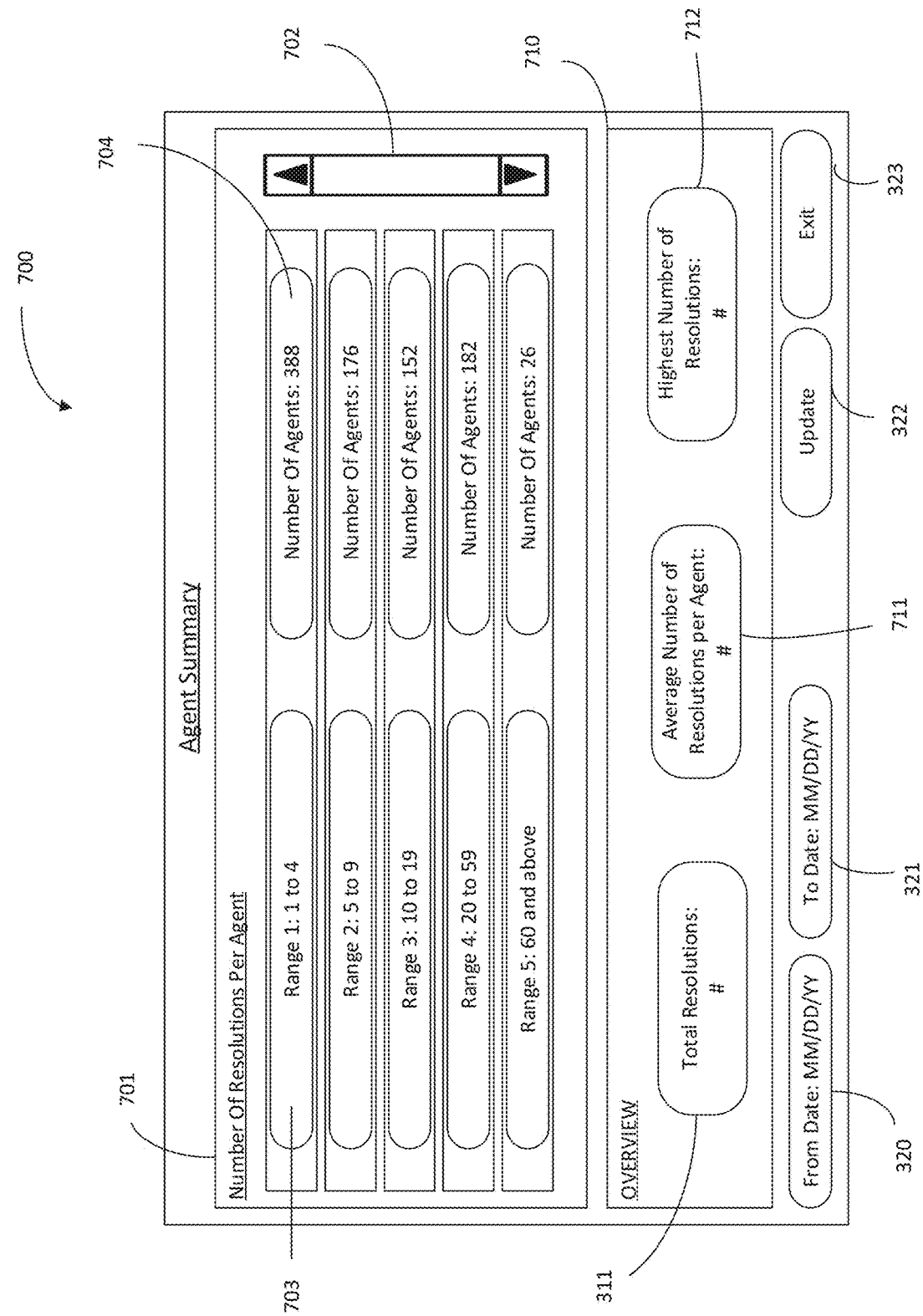
FIG. 7 is an example of a summary of the second outlier analysis test being presented on a graphical user interface in accordance with various potential embodiments.

Referring now to FIG. 7, an example of a summary 700 of the second outlier analysis test being presented on a graphical user interface is depicted in accordance with illustrative embodiments. The summary 700 includes a number of resolutions per agent section 701 that includes an indication of multiple ranges (e.g., indicator 703 indicates a first range) and an indication of the number of agents corresponding to each range (e.g., indicator 704 indicates the number of agents that were associated with resolutions within the first range). In some embodiments, the indicator 703 may be selected by a user that allows the user to update or change the values within the first range. For example, the user may select the indicator 703 and enter in a user input that changes the first range from 1-to-4 to 1-to -10. In some embodiments, the user input may cause the GUI to automatically update (e.g., automatically cause the enterprise computing system 102 to update indicator 704 based on the new range) or the user may select the update icon 322 to cause the GUI to update. Moreover, the indicator 704 may be selectable such that, when it is selected, causes the GUI to display a list of the agents (e.g., and/or the respective resolutions associated with each agent within the first range) within the first range, for example. In some embodiments, the summary 700 may include a scroll bar 702 that when selected via a user input causes the section 701 to display indicators that may not be visible in a first state. In this way, the summary improves the ability for the enterprise computing system 102 to interact with users in order to provide targeted information that can be used to inform decisions. The summary 700 may allow for the administrator to gauge the amount of resolutions handled by each agent.

In this example, the summary 700 includes indicator 320 (e.g., "from" date indicator), indicator 321 (e.g., "to" date indicator), the update icon 322, and the exit indicator 323 that are similar in structure and/or function as discussed in reference to FIG. 3. Also in this example, the summary 700 includes an overview section 710 that includes an indication of the total amount of resolutions analyzed (e.g., counted and populated by the enterprise computing system 102, which may indicate to a user that something is wrong if the number is not as expected) similar to indicator 310 as described in reference to FIG. 3. The overview section 710 may also include an indication regarding other statistics of the resolutions and/or agents. For example, the overview section 710 may include an indication of the average number of resolutions associated with each agent (e.g., via indicator 711) and/or an indication of the highest number of resolutions and/or agent associated with the highest number of resolutions (e.g., via indicator 712). In some embodiments, the indicator 712 may be selectable such that, when it is selected via a user input, the GUI is redirected and displays information or statistics regarding the agent with the highest number of resolutions and/or a list of the resolutions handled by the agent.

Figure 8:
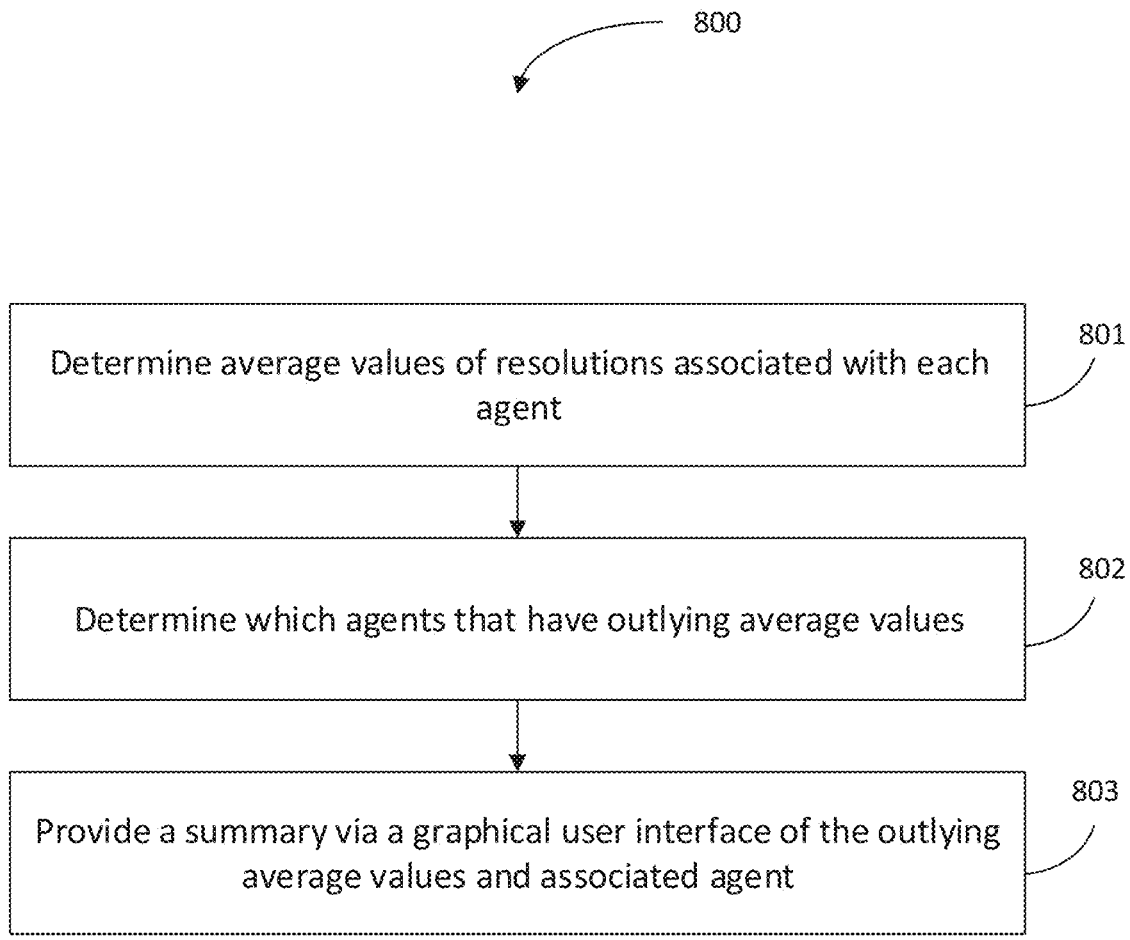
FIG. 8 depicts a flow diagram of a method of operation of a third outlier analysis test in accordance with various potential embodiments.

Referring now to FIG. 8, a flow diagram of a method 800 of operation of a third outlier analysis test is depicted in accordance with illustrative embodiments. The method 800 is an example of an outlier analysis test as described in reference to operation 403. In particular, the third outlier analysis test may determine and/or flag any agent that has given an unexpected value associated with the competition with associated resolutions (e.g., the relief amount).

In an operation 801, the enterprise computing system 102 determines the average values of resolutions granted from each agent. For example, the enterprise computing system 102 may determine via parsing through each resolution, identify an agent associated with the resolution (e.g., the agent that handled the resolution), and identify a value of a relief amount (e.g., a monetary value that the agent approved to pay to the client). The enterprise computing system 102 may then generate a database or categorization of the resolutions by each agent and calculate an average value of the relief amounts that each agent approved for the relief amounts. In some embodiments, the enterprise computing system 102 may generate a database that includes, for each agent, a list of all of the resolutions that the respective agent completed, the associated relief amount for each agent, and an average value of the relief amounts for all of the resolutions the respective agent completed. In some embodiments, the enterprise computing system may determine average values of other variables of the resolution in addition to or alternative to the relief amount.

In an operation 802, the enterprise computing system 102 determines which agents have outlying average values. The enterprise computing system 102 may determine which agents have outlying average values by determining a mean of the average values between all of the average values (e.g., the average value from each agent) and a standard deviation of the average values between all of the average values and determining which agents have an average value of the relief amount over a standard deviation above the mean. In some embodiments, the outlying average values may be determined by other methods such as determining which agents have an average value of the relief amount over a half or three-quarters above the mean. In another example, the outlying average values may be determined based on a pre-defined threshold. For example, the enterprise computing system 102 may determine that based on historical data of all previous agents and respective average values, that any agent with an average above a pre-defined threshold should be flagged as an outlying value. In some embodiments, the pre-defined threshold may be programmed into the enterprise computing system 102. For example, an administrator may wish to review any agent with an average value above $1,000 and input the $1,000 into the enterprise computing system 102 such that the enterprise computing system 102 may determine that any agent with an average above the pre-defined threshold of $1,000 (e.g., an outlying value).

In an operation 803, the enterprise computing system 102 provides a summary via a GUI of the outlying average values and associated agents. For example, the enterprise computing system 102 may transmit instructions for the user computing device 110a to display an indication of each identified agent, the respective average value for each identified agent, and an indication of which agents that have an average value determined to be an outlying value (e.g., via a red coloring or similar visual cue or by separately listing the agents with the outlying average values). In some embodiments, the enterprise computing system 102 may transmit a spreadsheet or other document to the user computing device 110a via an email or webpage that, when selected, causes the user computing device 110a to display the summary of the identified agents. An example of the summary is depicted and discussed in reference to FIG. 9. In other embodiments, the summary may include more general or more particular information regarding the outlying average values, associated agents, and respective resolutions used to calculate the average values.

Figure 9:
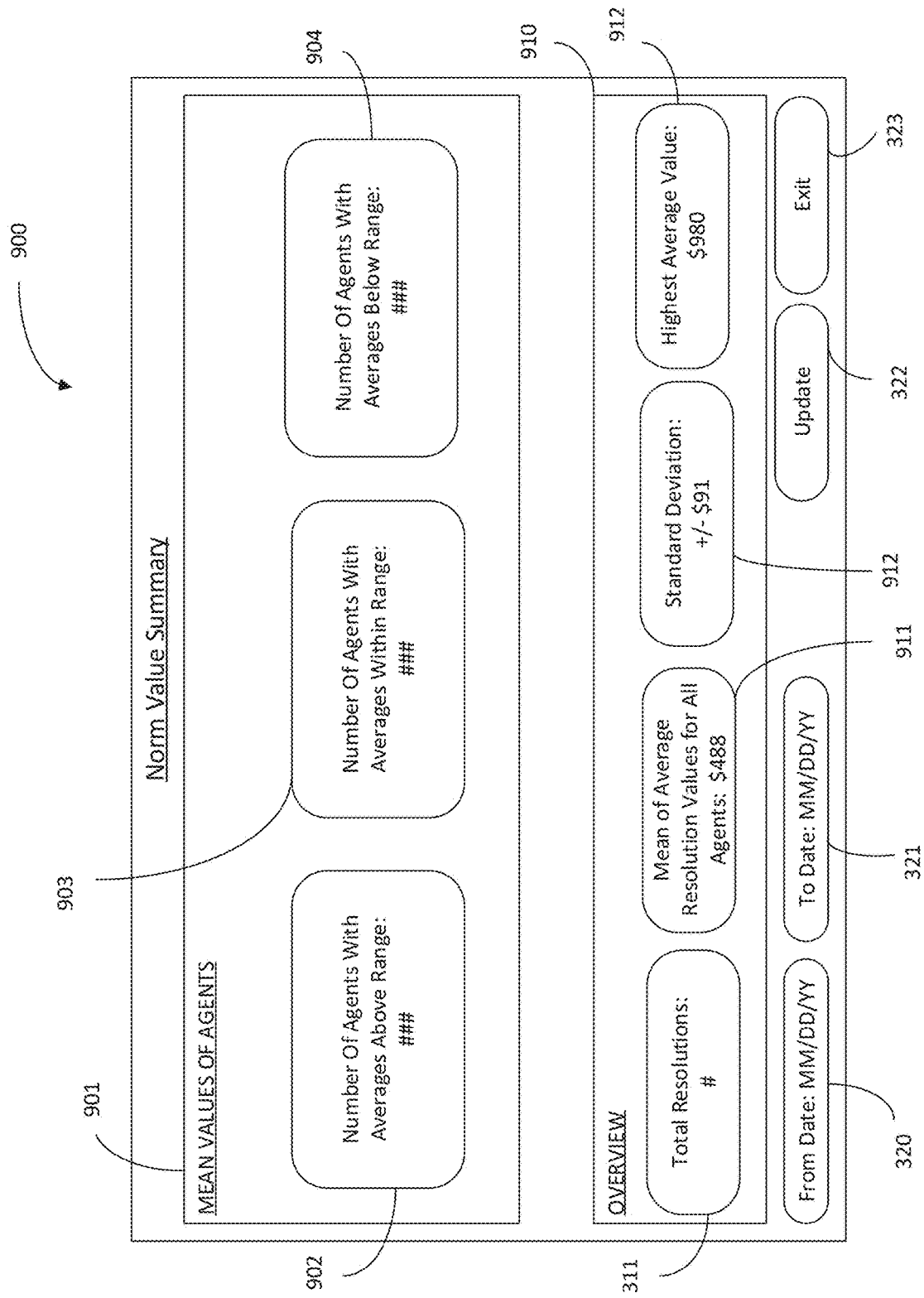
FIG. 9 is an example of a summary of the third outlier analysis test being presented on a graphical user interface in accordance with various potential embodiments.

Referring now to FIG. 9, an example of a summary 900 of the third outlier analysis test being presented on a graphical user interface is depicted in accordance with illustrative embodiments. The summary 900 includes an average value of agents section 901 and an overview section 910. The average value of agents section 901 may include an indication of the number agents determined to have outlying averages above the range (e.g., via indicator 902), within the range (e.g., via indicator 902), and below the range (e.g., via indicator 903). The overview section 910 may include an indicator 311, an indication of the mean of the average values of the relief amount (e.g., via indicator 911), an indication of the standard deviation of the relief amounts analyzed (e.g., via indicator 912), and/or an indication of highest average value and/or agent associated with the highest average value (e.g., via indicator 913). The summary 900 may be interactive in that a user may select the indicator 902, that when selected, causes the summary 900 to display more particular information (e.g., a list of agents having an average value above the range). In another interactive example, a user may select indictor 912 that, when selected, causes the GUI to redirect and automatically display statistics or a graphical representation of the average values of each agent. In this way, the enterprise computing system 102 provides interactive data (e.g., via tiering the data from general statistical measures or counts down to particular data elements) to the user that can be easily analyzed by the user in order to make determinations and/or judgments.

Figure 10:
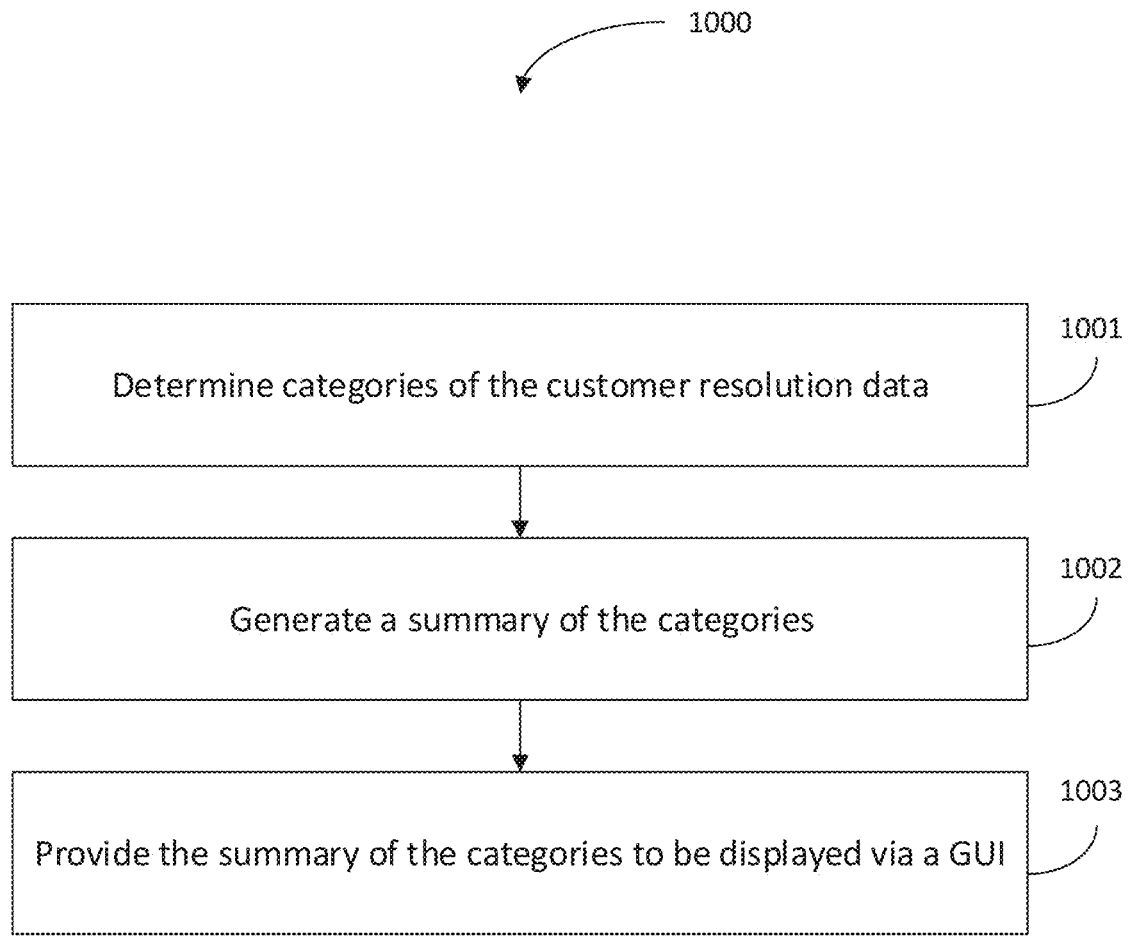
FIG. 10 depicts a flow diagram of a method of operation of a fourth outlier analysis test in accordance with various potential embodiments.

Referring now to FIG. 10, a flow diagram of a method 1000 of operation of a fourth outlier analysis test is depicted in accordance with illustrative embodiments. The method 1000 is an example of an outlier analysis test as described in reference to operation 403. In particular, the fourth outlier analysis test may determine outlying values within particular categories of the client resolution data and provide an outlier response that includes a summary of the outlying values and associated resolutions. For example, each resolution may include a number of relief categories and associated monetary values for the relief categories. A relief category may include particular issues for which the client has been determined to receive monetary relief such as fee amounts, client appreciation, balance forgiveness, and/or interest paid. The associated monetary values are the values actually paid to the client corresponding to each relief category.

In an operation 1001, the enterprise computing system 102 determines categories of the client resolution data. In some embodiments, the enterprise computing system 102 may receive an indication of which categories (e.g., which specific identifiers included within a variable of the resolution) should be included or categorized. In some embodiments, the enterprise computing system 102 may receive an indication (e.g., via a user input on a user computing device) of which variable(s) the enterprise computing system 102 should categorize the resolutions by. In response to receiving the indication of a variable to categorize the resolutions by, the enterprise computing system 102 may parse through values associated with the variable and categorize each resolution into separate categories or buckets based on the values found within the variable of each resolution. For example, each resolution may have product variable that define which product is at issue and associated relief amount (e.g., in relief amount category) each product identified as an issue in the resolution. In some embodiments, the enterprise computing system may identify multiple products at issue and associated relief amounts via analyzing the text of a comment entered via the agent or an auto-generated comment from the expected value engine. For example, when the agent is assisting the client, the agent may enter in, as inputs into the expected value engine, each product that the client has an issue or complaint about and other information such as calculated values associated with the product that the client has paid (e.g., interest, fees, etc.), and the expected value engine may output an indication to the agent a value of the relief amount that should be paid. Further, the enterprise computing system 102 may auto-generate an output that includes text or fields of each product entered into the engine, the calculated values, expected values of the relief amount for each product, and a total expected relief amount to be paid to the client for the resolution. The enterprise computing system 102 may then store the output from the expected value engine into the client resolution database 125. The enterprise computing system 102 may then access the auto-generated comment, parse through the text to identify known product codes or strings and identify the values (e.g., relief amounts) associated with each respective identified product for the resolution. The parsed text and associated value may be assigned a confidence interval based on the exact text match of the product line or code that the enterprise computing system 102 is searching for and the actual text in the comment.

In an operation 1002, the enterprise computing system 102 generates a database that includes the determined categories and associated relief amount. For example, the enterprise computing system 102 may parse through text to generate a database that includes pre-defined variables (e.g., each determined category) and corresponding values (e.g., the relief amounts for each of the determined categories). The enterprise computing system 102 may flag each resolution and more particularly the product category and associated relief amount (e.g., value determined as a relief amount category that corresponds to the product category) that has a confidence level below a lower pre-defined threshold. For example, the enterprise computing system 102 may flag each product category within a resolution that has a confidence level below 95%. The low confidence level may indicate that there was an error in the total relief amount paid to the client and may require additional attention. For example, if the comment is auto-generated via the expected value engine, the comment should have a predictable (e.g., consistent form) comment that is output and stored. Accordingly, a low confidence level may indicate that the comment was changed or that the expected value engine did not receive as inputs sufficient information to generate a consistent form of the comment.

The enterprise computing system 102 may further generate a summary that includes a list of each resolution that has a product category and/or associated relief amount with a confidence level below the lower threshold, a generalized summary that indicates the total amount of resolutions or product categories that have a confidence level below the lower threshold, an average value for each determined category (e.g., averaged across all of the resolutions), and/or outlying average values in each determined category (e.g., outlying values that are over a standard deviation above the mean in each category across all resolutions) with the associated resolutions that contain the outlying averages.

In an operation 1003, the enterprise computing system 102 provides a summary via a GUI of the resolutions associated with the determined outlier amounts within each category. For example, the enterprise computing system 102 may transmit instructions to the user computing device 110a that cause the computing device to display a list of each resolution that has a product category and/or associated relief amount with a confidence level below the lower threshold, a generalized summary that indicates the total amount of resolutions or product categories that have a confidence level below the lower threshold, an average value for each determined category (e.g., averaged across all of the resolutions), and/or outlying average values in each determined category (e.g., outlying values that are over a standard deviation above the mean in each category across all resolutions) with the associated resolutions that contain the outlying averages. In some embodiments, the enterprise computing system 102 may transmit a spreadsheet or other document to the user computing device 110a via an email or webpage that, when selected, causes the user computing device 110a to display the summary of the product categories along with statistics thereof. An example of the summary is depicted and discussed in reference to FIG. 11. In other embodiments, the summary may include more general or more particular information regarding the categories. In some embodiments, the summary is interactive such that more general information includes links that cause the user computing device 110a to display more particular information when selected.

Figure 11:
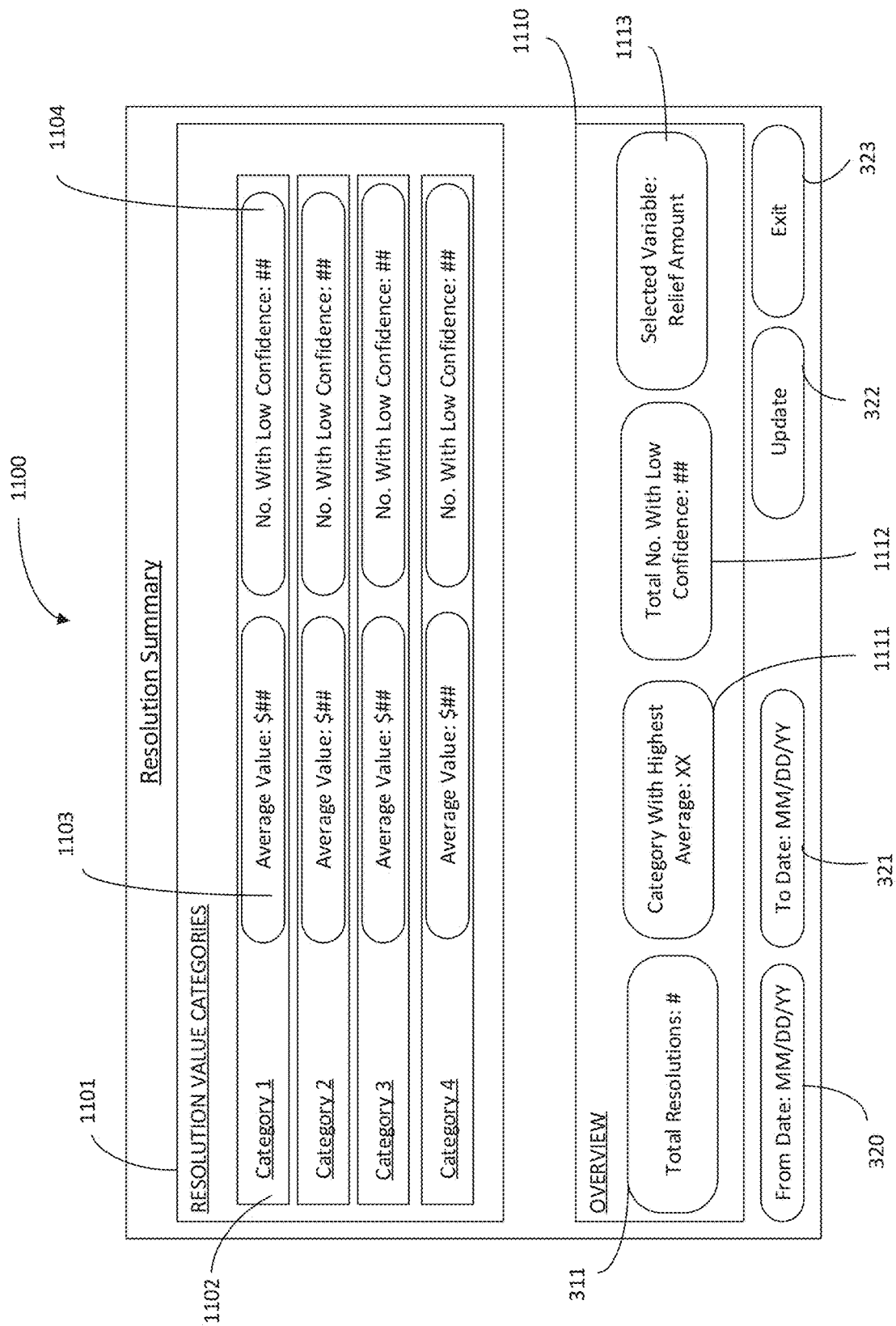
FIG. 11 is an example of a summary of the fourth outlier analysis test being presented on a graphical user interface in accordance with various potential embodiments.

Referring now to FIG. 11, an example of a summary 1100 of the fourth outlier analysis test being presented on a graphical user interface is depicted in accordance with illustrative embodiments. The summary 1100 includes a resolution value (e.g., relief amount) categories section 1101 (e.g., a section corresponding to the categories within the relief amount or categories within a selected variable) and an overview section 1110. A relief amount categories section 1101, for example, may include an indication of all of the categories within the relief amount variable (e.g., selected variable) that have been identified (e.g., indicator 1102 showing Categories 1 through 4), an indication of the average value corresponding to each category (e.g., indicator 1103 depicts an average value of the resolutions having a fees paid subcategory in the relief amount variable), and a number of resolutions corresponding to each category that have a low confidence factor assigned to them because of uncertainty (e.g., indicator 1104 depicts the number of resolutions having a low confidence factor that correspond to the fees paid category). The summary 1100 may be interactive in that when a user selects the indicator 1102 category of, for example, "Fees Paid," "Interest Paid," "Balance Forgiveness," or "Customer Appreciation," the GUI automatically re-directs to display additional information regarding the corresponding (e.g., "Fee Paid") product such as a standard deviation, number of agents having outlying ranges, a list of resolutions identified as having a fees paid subcategory, or other statistics regarding the fees paid, etc. Further, when a user selects the indicator 1104, the GUI may automatically redirect to display information regarding or a list of the resolutions that include a value for the respective product with a low confidence factor. In this way, the enterprise computing system 102 improves the ability of the computing system to interact with a user and provide relevant and targeting information that may allow the user to better understand the program or initiative of the enterprise.

The overview section 1110 may include information regarding the fourth analysis test such as the total number of resolutions included (e.g., via indicator 311), an indication of the category with the highest average (e.g., via indicator 1111), an indication of the total number of resolutions with a low confidence factor (e.g., via indicator 1112), and/or a variable icon 1113. The variable icon 1113 indicates the variable that has been broken down to subcategories (e.g., in this example the relief amount). In some embodiments, the variable icon 1113 may be selectable, such that when it is selected, a user is presented with a list of variables within each resolution (and thereby stored within the database) that the user may select (e.g., via a user input) in order to instruct the enterprise computing system 102 to perform method 1000 on the resolutions with the selected variable. In some embodiments, the enterprise computing system 102 may automatically perform method 1000 in response to a new selected variable or in response to receiving a user input of a selection of the update icon 322.

Figure 12:
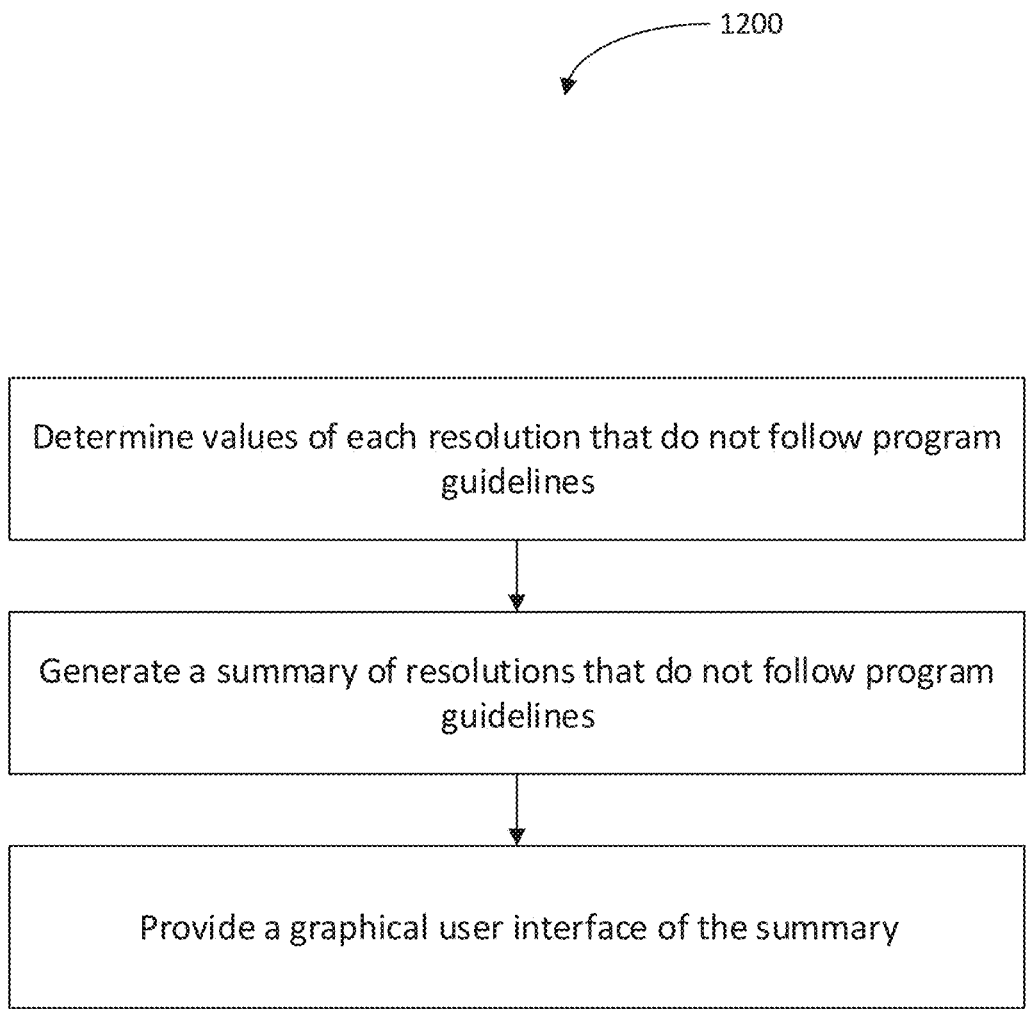
FIG. 12 depicts a flow diagram of a method of operation of a fifth outlier analysis test in accordance with various potential embodiments.

Referring now to FIG. 12, a flow diagram of a method 1200 of operation of a fifth outlier analysis test is depicted in accordance with illustrative embodiments. The method 1200 is an example of an outlier analysis test as described in reference to operation 403. In particular, the fifth outlier analysis test may determine resolutions that do not follow the program guidelines.

In an operation 1201, the enterprise computing system 102 analyzes the values associated with each resolution and determines the values that do not follow program guidelines. For example, the program may have guidelines that change (e.g., due to an attempt to increase the efficiency of the program). The guidelines may change such as to include a minimum amount, a first range, a second range, and/or a maximum amount of relief for a particular products category or the total relief amount. The enterprise computing system 102 may analyze each of the resolutions for relief amount categories (e.g., relief amounts associated with a particular product) or the total relief amounts that fall outside of the guidelines. For example, a resolution that includes a relief amount below the minimum amount may be flagged or identified as not following the program guidelines. In some embodiments, the guidelines (e.g., rules of determining relief amounts, thresholds, and/or ranges) may be programmed into a memory of the enterprise computing system 102 for the enterprise computer system to compare to the resolutions.

In an operation 1202, the enterprise computing system 102 generates a summary of the resolutions that do not follow the program guidelines. For example, the enterprise computing system 102 may compile each resolution that has been determined to deviate from the program guidelines, the value that was determined to have deviated, and generalized information thereof. The generalized information may include a count of the total number of resolutions that followed the program guidelines (e.g., that fell within the first range or the second range) and the count of the total number of resolutions that did not follow the program guidelines (e.g., resolutions with values above the maximum or below the minimum.

In an operation 1203, the enterprise computing system 102 provides a GUI of the summary. An example of the summary is depicted and discussed in reference to FIG. 13. In other embodiments, the summary may include more general or more particular information regarding the resolutions that have and have not followed program guidelines. In some embodiments, the summary is interactive such that more general information includes links that cause the user computing device 110*a* to display more particular information when selected.

Figure 13:
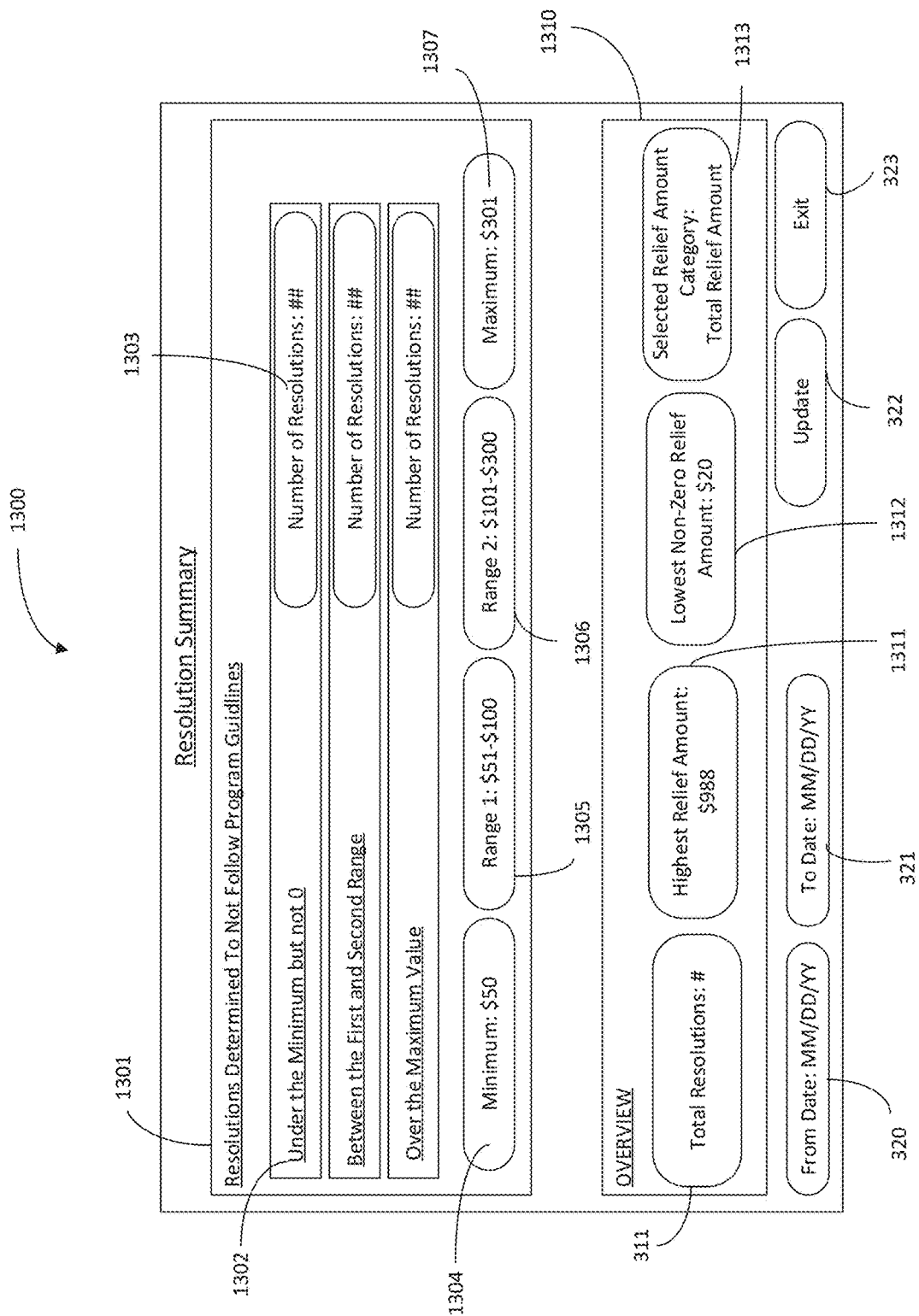
FIG. 13 is an example of a summary of the fifth outlier analysis test being presented on a graphical user interface in accordance with various potential embodiments.

Referring now to FIG. 13, an example of a summary 1300 of the fourth outlier analysis test being presented on a graphical user interface is depicted in accordance with illustrative embodiments. The summary 1300 includes a section of resolutions determined not to follow guidelines 1301 and an overview section 1310. The section of resolutions determined not to follow guidelines 1301 includes an indication of resolutions determined to be under the minimum but not zero (e.g., via indicator 1302), an indication of the resolutions that had relief amounts within a first or second range or outside of the ranges but within the maximum and minimum (e.g., via an indicator 1305), resolutions that were over the maximum value (e.g., via indicator 1306), and a corresponding number of resolutions for each range (e.g., indictor 1303 depicts the number of cases that were below the minimum but non-zero. The section 1301 may also include information such as a minimum value indicator (e.g., may be manually changeable via the GUI or automatically determined during the method 1200), a first range indicator 1311 indicating a first range, a second range 1312 indicator indicating the bounds of the second range, and a maximum value indicator 1313. The summary 1300 may also be interactive in that when a user selects the indicator 1302, the GUI is automatically re-directed and displays a list of the resolutions corresponding to the resolutions below the minimum amount. The administrator or user may then be able to analyze the resolutions to determine why the program guidelines were not followed.

The overview section 1310 includes indicator 311, an highest relief amount 1311 indicator indicating the highest identified relief amount within the resolutions, a lowest non-zero relief amount 1312 indicating the lowest identified non-zero relief amount within the resolutions, an a selected variable icon 1313. For example, the selected variable icon 1313, when selected via a user input, may display a drop down list of each identified relief amount category variables and/or a total relief amount option that indicate to the enterprise computing system 102 which variable to run the fifth outlying analysis test on. In response to a user selecting a new variable in the selected variable icon 1313 the GUI may send instructions (e.g., automatically or in response to a selection of update icon 322) including the new user inputs to enterprise computing system 102 to perform method 1200 with the selected variable (and/or other inputs selected such as a change in the date range).

Figure 14:
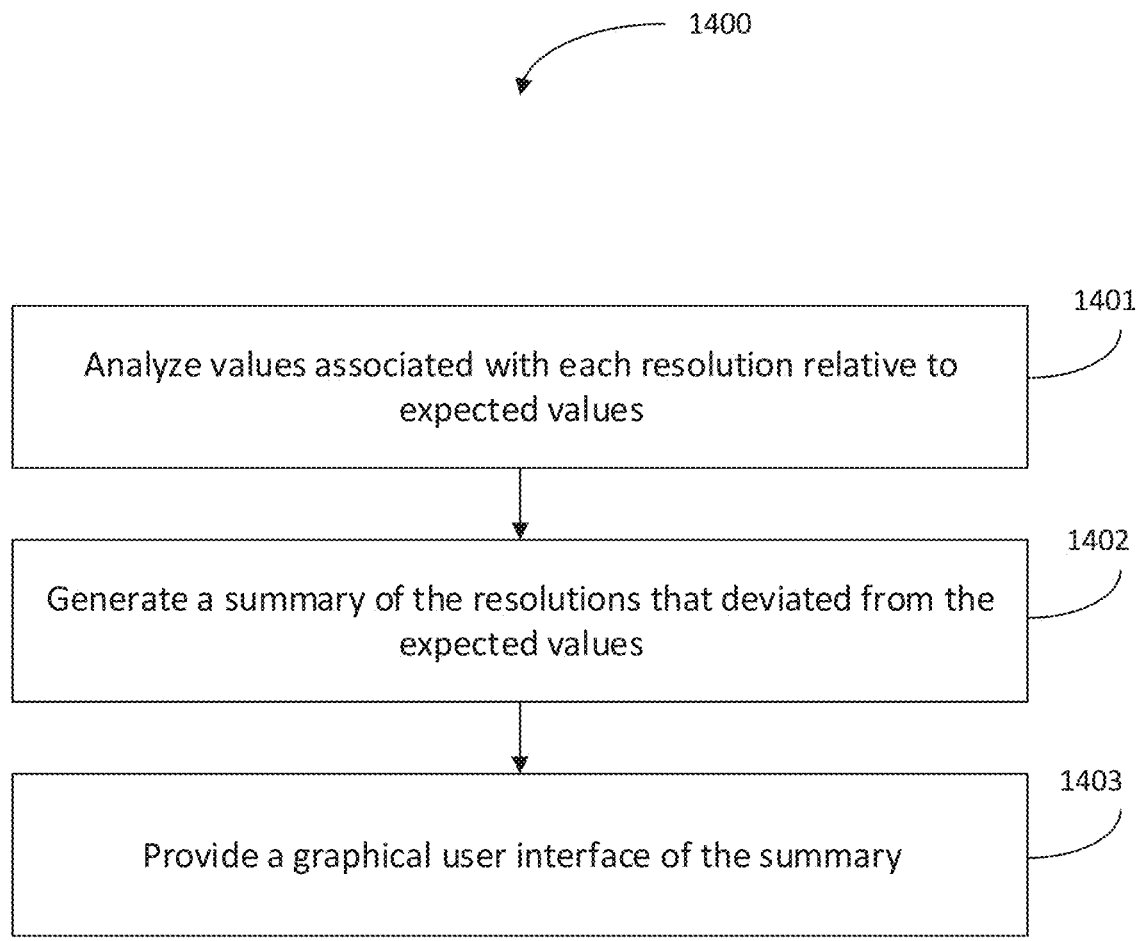
FIG. 14 depicts a flow diagram of a method of operation of a sixth outlier analysis test in accordance with various potential embodiments.

Referring now to FIG. 14, a flow diagram of a method 1400 of operation of a sixth outlier analysis test is depicted in accordance with illustrative embodiments. The method 1400 is an example of an outlier analysis test as described in reference to operation 403. In particular, the sixth outlier analysis test may determine or be used in determining outlying resolutions based on a comparison between a value associated with the remediation (e.g., a monetary value paid to the client) of the resolution and an expected value calculated using the expected value engine.

In an operation 1401, the enterprise computing system 102 analyzes values associated with each resolution relative to expected values. In some embodiments, the enterprise computing system 102 analyzed a particular variable (e.g., either programmed into memory or received with a request when the enterprise computing system 102 is prompted to perform method 1400) such as a relief amount variable. In some embodiments, the expected values may be generated or determined using information from the resolution and the expected value engine. In some embodiments, the expected values may have been stored within the resolution database from when the agent was using the expected value engine to determine relief amounts for a particular client. For example, a resolution may include a relief amount category. As explained above in reference to FIG. 10, the enterprise computing system 102 may access or generate a database that includes an expected value of each associated relief amount (e.g., generated from the expected value database) and/or the actual relief amount paid to the client for each respective category. The enterprise computing system 102 may compare the actual values to the expected values to determine outlying values. For example, the enterprise computing system 102 may compare the total relief amount to the total expected relief amount (e.g., expected based on the particular client circumstances) and determine that the total relief amount is an outlier if the actual value is over an upper threshold or below a lower threshold relative to the total expected relief amount. In some embodiments, the upper and lower thresholds are dynamic in that they may be calculated as a percentage (e.g., 20 percent) above or below the total expected value. The outlying values of the actual relief amounts may indicate that the expected value engine is not being used and that the respective agent is providing the client with an inconsistent result, which may cause resentment from the client or reputational damage to the enterprise.

In an operation 1402, the enterprise computing system 102 generates a summary of the resolutions that deviated from the expected value. For example, the enterprise computing system 102 may determine and/or compile the total number of resolutions that deviated from the respective expected value, the total number of resolutions that did not deviate from the respective expected value, and a list of the resolutions that did deviate from the respective expected value. That is, in some embodiments, the summary may include a generalized (e.g., statistical overview) of the resolutions that have been determined to have deviated from the expected value, an agent list with a total number or list of respective resolutions that deviated from their expected value, a products category list (e.g., list of product categories) with a total number or list of respective resolutions that deviated from their expected value, and/or other representations of the resolutions.

In an operation 1403, the enterprise computing system 102 provides the summary via a GUI to a user computing device 110*a*. An example of the summary is depicted and discussed in reference to FIG. 15. In other embodiments, the summary may include more general or more particular information regarding the resolutions that have and have deviated from the expected value. In some embodiments, the summary is interactive such that more general information includes links that cause the user computing device 110*a* to display more particular information when selected.

Figure 15:
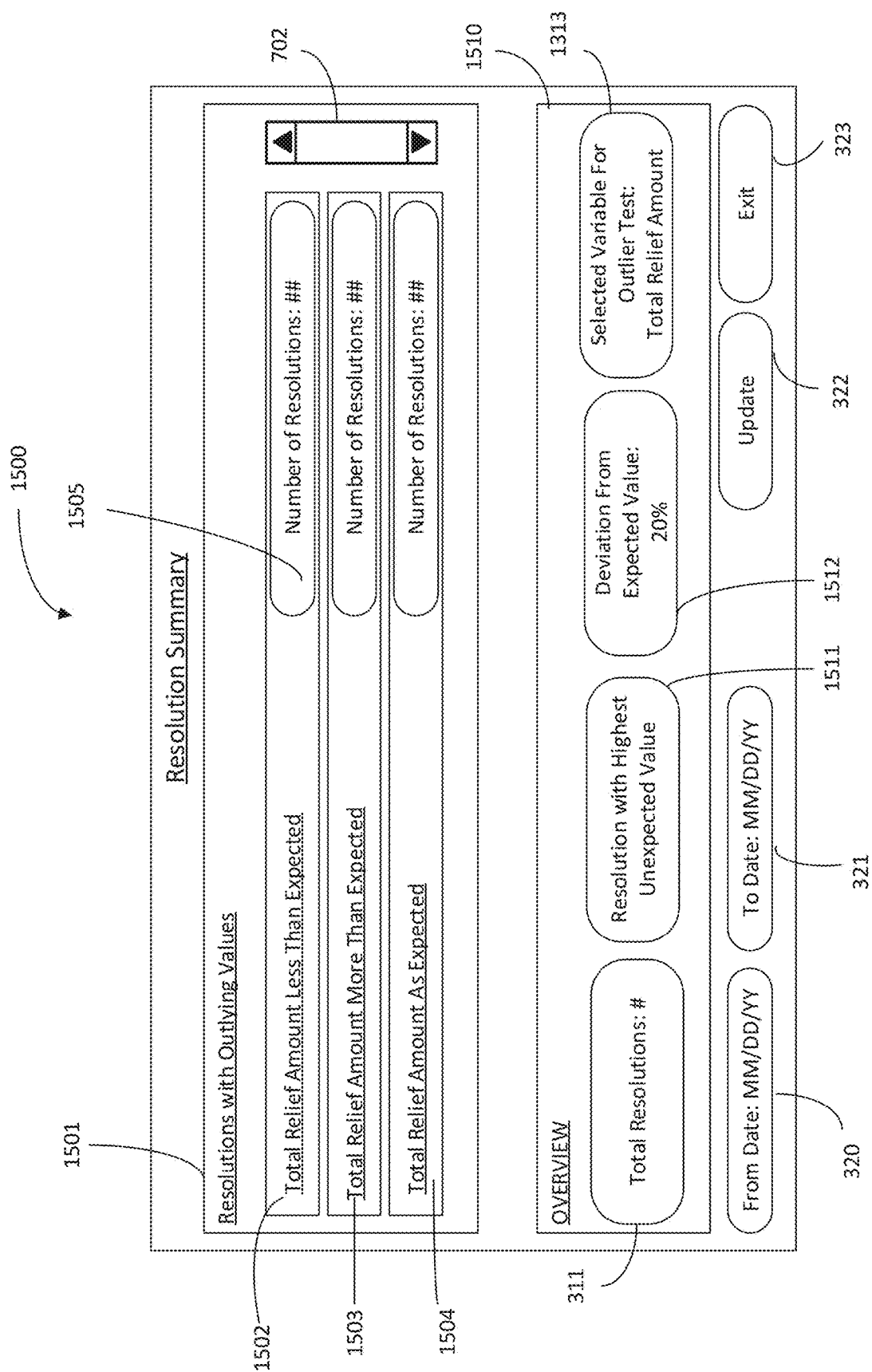
FIG. 15 is an example of a summary of the sixth outlier analysis test being presented on a graphical user interface in accordance with various potential embodiments.

Referring now to FIG. 15, an example of a summary 1500 of the fourth outlier analysis test being presented on a graphical user interface is depicted in accordance with illustrative embodiments. The summary 1500 includes resolutions with outlying values section 1501 (e.g., first section) and an overview section 1510 (e.g., second section). The section 1501 may include an indicator 1502 that indicates a first parameter of the sixth outlier test such as a total number of resolutions with relief amounts that were less than expected, an indictor 1503 that indicates a second parameter of the sixth outlier test such as a total number of resolutions with relief amounts that were more than expected, an indicator 1503 that indication a number of resolutions having relief amounts within an expected range (e.g., relief amount within +/−20% of the expected value calculated by the expected value engine), and corresponding indication of the number of resolutions counted for each parameter (e.g., indicator 1505 indicates the number of resolutions that fit within the first parameter). The summary 1500 may be interactive such, for example, that when the indicator 1505 is selected, the GUI is automatically redirected to display a list of the resolutions that were determined to be less than 20% of the expected value. In this way, the summary may provide an interactive and tier data landscape of the resolutions such that an administrator or user may be able to interactively, efficiently, and reliably analyze how closely the expected value engine is being followed or used by the agents and/or identify particular agents that are deviating from the tools provided for the program.

The overview section 1510 includes an overview or statistical analytics of the resolutions analyzed by the enterprise computing system 102 in the sixth outlier analysis test. For example, the overview section 1510 includes total resolution indicator 311, an indicator 1511 of the resolution with the highest unexpected value (e.g., highest relative to a respected expected value), an indicator 1512 that depicts the set deviation that the selected variable (e.g., relief amount) may be before the corresponding resolution is flagged as either being more or less than expected (e.g., 20% in this example), and the selected variable icon 1313. In some embodiments, the indicator 1512 may be selectable such that, when selected the GUI may receive a user input changing the deviation percentage used in method 1512. The GUI and/or user computing device 110*a* may then package and transmit a request with the new information (e.g., changed deviation percentage) with instructions for the enterprise computing system 102 to perform method 1400 with the new parameters or inputs. In response, the GUI may update upon receiving an updated summary.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method for analyzing a protocol of an enterprise, the method comprising:
    maintaining, by a processor in communication with a plurality of electronic databases, client resolution data including information regarding multiple resolutions, the client resolution data captured via electronic communications from respective user devices associated with agents;
    accessing, by the processor, from the plurality of electronic databases, the client resolution data including information regarding multiple resolutions, each resolution of the multiple resolutions being associated with a claim from a respective client and including an identity of an agent, a resolution value, and respective text data;
    executing, by the processor, an expected value machine learning model trained using machine-learning techniques based on datasets generated using prior resolution data, the expected value machine learning model configured to receive the client resolution data as input and generate an expected resolution value for each claim associated with the multiple resolutions;
    executing, by the processor, a machine-learning natural language processing (NLP) model to generate a resolution dataset comprising an instance for each claim and variables for each instance, wherein the variables include the resolution value, the identity of the agent, the expected resolution value of the claim generated by the expected value machine learning model, and an identification of products provided by the enterprise and associated with the claim, the machine-learning NLP model executed using the respective text data of the claim as input;
    executing, by the processor, an outlier detection model comprising one or more outlier analysis tests executed using the resolution dataset as input to identify abnormal resolutions, wherein executing the outlier detection model generates (i) an identifier of at least one of the variables that has a value that violates at least one rule of at least one resolution, and (ii) one or more categorizations of the resolutions based on at least one of the variables;
    providing, by the processor, an interactive graphical user interface (GUI) comprising an outlier response including indications of the abnormal resolutions, the GUI comprising (i) a plurality of interactive elements that enable automatic reorganization of the indications of the abnormal resolutions in response to user input, and (ii) a plurality of second interactive elements that correspond respectively to a plurality of agents involved in the abnormal resolutions, each second interactive element of the plurality of second interactive elements causing display of a respective second user interface in response to an interaction, the second respective user interface comprising one or more respective abnormal resolutions involving a respective agent identified by the second interactive element;
    storing, by the processor, the indications of the abnormal resolutions as additional prior resolution data; and
    training, by the processor, the expected value machine learning model based on the additional prior resolution data using machine-learning techniques.

2. The method of claim 1, wherein one or more agents are claim resolution chat bots configured to interact with clients to resolve claims thereof.

3. The method of claim 1, wherein applying the outlier detection model comprises:
    determining, via the processor, resolutions that have unexpected values corresponding to respective data fields based on a first rule and a second rule; and
    generating, via the processor, a summary of the resolutions determined to have unexpected values, wherein the outlier response includes the summary.

4. The method of claim 3, wherein the first rule comprises determining that a resolution has unexpected values if the resolution value is zero and other data fields are populated, and wherein the second rule comprises determining that the resolution has unexpected values if the resolution value is non-zero and the other data fields are not populated.

5. The method of claim 4, wherein the summary is interactive such that generalized information includes selectable links that, when selected, cause the GUI to automatically display more particular information regarding the resolutions determined to have unexpected values.

6. The method of claim 1, wherein applying the outlier detection model comprises:
    determining, via the processor, resolutions that correspond to each agent identified in the client resolution data; and
    generating a summary of a total number of resolutions that correspond to each agent, wherein the outlier response includes the summary.

7. The method of claim 6, wherein the summary includes an indication of pre-defined ranges of a number of resolutions that correspond to a particular agent and a corresponding number of agents that are within the pre-defined ranges.

8. The method of claim 1, wherein applying the outlier detection model comprises:
    determining, via the processor, an average value for each agent, wherein the average value is an average of the resolution value for each resolution that corresponds to the respective agent;
    determining, via the processor, agents that have outlying average values; and
    generating, via the processor, a summary of the agents that have outlying average values, wherein the outlier response includes the summary.

9. The method of claim 1, wherein applying the outlier detection model comprises:
    determining, via the processor, categories of the resolution value;
    determining, via the processor, an amount associated with each category of the resolution value; and generating, via the processor, a summary of categories of the resolution values and corresponding amounts, wherein the summary includes a list of the categories of the resolution values and an average amount of the amounts associated with each category of the resolution value, wherein the outlier response includes the summary.

10. The method of claim 9, wherein determining the amount associated with each category of the resolution value comprises analyzing, via the processor, text associated with respective resolutions to identify the categories of the resolution values and corresponding amount, wherein analyzing the text comprises applying, via the processor, natural language processing to the text.

11. The method of claim 1, wherein applying the outlier detection model comprises:
 determining, via the processor, values of each resolution that do not follow program guidelines, wherein the values that do not follow program guidelines are above a maximum value or below a minimum value; and
 generating, via the processor, a summary of the resolutions determined to not follow program guidelines, wherein the outlier response includes the summary.

12. The method of claim 1, wherein executing the outlier detection model comprises:
 analyzing, via the processor, the resolution value of each resolution relative to the expected resolution value for the respective resolution;
 compiling, via the processor, resolutions that that have a respective resolution value outside of a range of the expected resolution value; and
 generating, via the processor, a summary of the resolutions that have a resolution values outside of the range of the respective expected resolution values, wherein the outlier response includes the summary.

13. The method of claim 12, wherein the range includes the respective expected value of the resolution plus or minus a percentage of the respective expected value.

14. The method of claim 13, wherein the respective expected values are determined by an expected value engine based on the client associated with the resolution.

15. A computer implemented method of analyzing a protocol of an enterprise, the method comprising:
 accessing, via a processor, client resolution data including information regarding multiple resolutions, wherein each resolution includes an identity of an agent and a relief amount, each resolution of the multiple resolutions being associated with a claim from a respective client and including an identity of an agent, and a resolution value;
 executing, by the processor, an expected value machine learning model trained using machine-learning techniques based on datasets generated using prior resolution data, the expected value machine learning model configured to receive the client resolution data as input and generate an expected resolution value for each claim associated with the multiple resolutions;
 executing, by the processor, an outlier detection model comprising one or more outlier analysis tests executed using the multiple resolutions and the expected resolution value for each claim of the multiple resolutions as input to identify abnormal resolutions, wherein executing the outlier detection model generates (i) an identifier of at least one variable of the resolutions that has a value that violates at least one rule of at least one resolution, and (ii) a categorization of the multiple resolutions based on the at least one variable;
 generating, via the processor, a stratified sample dataset from the client resolution data, the stratified sample dataset being stratified based on the categorization of the multiple resolutions and comprising expected resolution value for each claim associated with the multiple resolutions;
 generating, via the processor, a summary of the stratified sample data set, the summary comprising the categorization of the multiple resolutions and the identifier of the at least one variable that has the value that violates the at least one rule;
 providing, via the processor, the summary of the stratified sample data set in a graphical user interface (GUI) the GUI comprising a plurality of interactive elements that enable automatic reorganization of the indications of the abnormal resolutions in response to user input;
 storing, via the processor, the summary of the stratified sample dataset as additional prior resolution data; and
 training, via the processor, expected value machine learning model based on the additional prior resolution data.

16. The method of claim 15, wherein generating the stratified sample data set comprises:
 determining, via the processor, multiple categories of the resolutions, wherein the multiple categories correspond to products associated with each resolution;
 determining, via the processor, an amount of resolutions that correspond to each of the multiple categories;
 determining, via the processor, a sample dataset size; and
 selecting, via the processor, one or more resolutions for each of the multiple categories based on a proportional amount of the amount of resolutions in each of the multiple categories relative to a total number of resolutions and the sample dataset size.

17. The method of claim 16, further comprising, selecting, via the processor, one or more alternative resolutions for the stratified sample data set.

18. A system, comprising:
 a display configured to present a graphical user interface (GUI); and
 a processor and program logic stored in memory and executed by the processor, the program logic including auditing logic configured to:
  maintain, in a plurality of electronic databases, client resolution data including information regarding multiple resolutions, the client resolution data captured via electronic communications from respective user devices associated with agents;
  access the client resolution data from the plurality of electronic databases, the client resolution data comprising information regarding multiple resolutions, each resolution being associated with a complaint or claim from a respective client and including multiple variables with corresponding values, each claim comprising respective text data;
  execute an expected value machine learning model trained using machine-learning techniques based on datasets generated using prior resolution data, the expected value machine learning model configured to receive the client resolution data as input and generate an expected resolution value for each claim associated with the multiple resolutions;
  execute a machine-learning natural language processing (NLP) model to generate a resolution dataset comprising an instance for each claim and variables for each instance, wherein the variables include the resolution value, an identity of the agent, the expected resolution value of the claim generated by the expected value machine learning model, and an identification of products provided by the enterprise and associated with the claim, the machine-learning NLP model executed using the respective text data of the claim as input;

execute an outlier detection model trained using the resolution dataset as input to identify abnormal resolutions, wherein execution of the outlier detection model generates:

(i) an identifier of at least one of the variables within each resolution that has a value that violates at least one rule of at least one resolution; and (ii) a summary comprising one or more categorizations of the resolutions based on at least one of the variables that violates the at least one rule of the at least one resolution;

display, in the GUI, an outlier response comprising the summary, such that the summary comprises a plurality of interactive elements that enable automatic reorganization of the summary in response to user input;

store the summary as additional prior resolution data; and train the expected value machine learning model based on the additional prior resolution data.

19. The system of claim 18, the program logic further comprising expected value logic configured to:

receive, as an input, information regarding a client including products associated with the client;

determine an expected relief amount for the client based on the products associated with the client and a predefined model; and store the information regarding the client the expected relief amount for the client within a database.

20. The system of claim 18, wherein the outlier response comprises one or more interactive summaries of the resolutions having outlying values.

* * * * *